United States Patent
Matsumoto

[11] Patent Number: 6,064,491
[45] Date of Patent: *May 16, 2000

[54] FACSIMILE APPARATUS USING A SMALL COMPUTER SYSTEM INTERFACE

[75] Inventor: Naoyuki Matsumoto, Yokohama, Japan

[73] Assignee: Canon Kabushiki Kaisha, Tokyo, Japan

[ * ] Notice: This patent is subject to a terminal disclaimer.

[21] Appl. No.: 08/867,940

[22] Filed: Jun. 3, 1997

Related U.S. Application Data

[62] Division of application No. 08/337,234, Nov. 4, 1994, Pat. No. 5,684,607, and a continuation of application No. 07/889,199, May 28, 1992, abandoned.

[30] Foreign Application Priority Data

Jun. 5, 1991 [JP] Japan .................................. 3-134076

[51] Int. Cl.[7] .................................................. H04N 1/32
[52] U.S. Cl. ...................... 358/1.15; 358/434; 358/442; 358/468
[58] Field of Search ............................ 358/400, 434–440, 358/442, 468, 403, 1.14, 1.15; 379/100.01, 102.02; 399/75, 76; 395/114; H04N 1/32

[56] References Cited

U.S. PATENT DOCUMENTS

| | | | |
|---|---|---|---|
| 3,920,896 | 11/1975 | Bishop et al. | 178/26 R |
| 4,652,933 | 3/1987 | Koshiishi | 358/256 |
| 4,786,974 | 11/1988 | Ina | 358/257 |
| 4,907,094 | 3/1990 | Mishima et al. | 358/437 |
| 5,010,581 | 4/1991 | Kanno | 382/56 |
| 5,021,892 | 6/1991 | Kita et al. | 358/468 |
| 5,163,088 | 11/1992 | LoCascio | 358/442 |
| 5,196,943 | 3/1993 | Hersee et al. | 379/100 |
| 5,270,833 | 12/1993 | Kubokawa et al. | 379/100 |
| 5,684,607 | 11/1997 | Matsumoto | 358/442 |
| 5,720,014 | 2/1998 | Ikeda et al. | 395/114 |

FOREIGN PATENT DOCUMENTS

| | | |
|---|---|---|
| 3306520 | 9/1983 | Germany . |
| 2166620 | 5/1986 | United Kingdom . |

*Primary Examiner*—Kim Yen Vu
*Attorney, Agent, or Firm*—Fitzpatrick, Cella, Harper & Scinto

[57] ABSTRACT

A facsimile apparatus having a scanner for reading original images, a memory for storing images, a printer for recording images, and a communication control section for controlling the transmission/reception of data with a receiving communication apparatus is connected to a host computer via a small computer system interface (SCSI). As a result, the scanner, the memory, the printer and the communication control apparatus provided in the facsimile apparatus can be controlled from the host computer. Data can be transferred between the host computer and the facsimile apparatus at a higher speed, and the scanner, the memory, the printer and the communication control apparatus can be effectively controlled from the host computer. Thus, various kinds of applications can be realized.

46 Claims, 29 Drawing Sheets

FIG. 14

| TYPE OF COMMAND | COMMAND PHASE PARAMETER | DATA PHASE PARAMETER | FLOW OF DATA |
|---|---|---|---|
| RESERVE UNIT | NO | NO | |
| RELEASE UNIT | NO | NO | |
| INFORMATION REQUEST | SIZE OF DATA TO BE ACCEPTED | TYPE OF MODEL, VERSION, TERMINAL PERFORMANCE, CAUSES OF ABNORMALITY | PC ←—— FAX |

FIG. 15

| TYPE OF COMMAND | COMMAND PHASE PARAMETER | DATA PHASE PARAMETER | FLOW OF DATA |
|---|---|---|---|
| SCANNER INFORMATION REQUEST | SIZE OF DATA TO BE ACCEPTED | ORIGINAL DOCUMENT DETECTION INFORMATION, ABNORMALITY NOTIFICATION | PC ←--- FAX |
| READING PARAMETER SET | SIZE OF DATA TO BE SENT OUT | RESOLUTION, READING SIZE, ENCODING SYSTEM, DENSITY, IMAGE PROCESSING METHOD | PC ---→ FAX |
| READING REQUEST | FILE TYPE SPECIFICATION | NO | |
| FILE INFORMATION REQUEST | SIZE OF DATA TO BE ACCEPTED, COMMAND TYPE | CREATED FILE INFORMATION AS A RESULT OF EXECUTING READING REQUEST | PC ←--- FAX |
| STOP | NO | NO | |
| STATUS REQUEST | SIZE OF DATA TO BE ACCEPTED | CAUSES OF ABNORMALITY | PC ←--- FAX |

FIG. 16

| TYPE OF COMMAND | COMMAND PHASE PARAMETER | DATA PHASE PARAMETER | FLOW OF DATA |
|---|---|---|---|
| PRINTER INFORMATION REQUEST | SIZE OF DATA TO BE ACCEPTED | RECORDING PAPER INFORMATION, ABNORMALITY NOTIFICATION | PC ← FAX |
| PRINTER OUTPUT REQUEST | SIZE OF DATA TO BE SENT OUT | PRINT OUTPUT FILE SPECIFICATION | PC → FAX |
| STOP | NO | NO | |
| STATUS REQUEST | SIZE OF DATA TO BE ACCEPTED | CAUSES OF ABNORMALITY | PC ← FAX |

FIG. 17

| TYPE OF COMMAND | COMMAND PHASE PARAMETER | DATA PHASE PARAMETER | FLOW OF DATA |
|---|---|---|---|
| ATTRIBUTE SPECIFICATION | SIZE OF DATA TO BE SENT OUT | SPECIFICATION OF ATTRIBUTES OF FILE TO BE CREATED IMAGE DATA: PAPER SIZE, RESOLUTION, ENCODING METHOD CHARACTER DATA: CHARACTER TYPE | PC → FAX |
| DATA WRITE | SIZE OF DATA TO BE SENT OUT, DATA CONTINUATION FLAG, PAGE CONTINUATION FLAG, | DATA (IMAGE, CHARACTER) | PC → FAX |
| FILE SPECIFICATION | SIZE OF DATA TO BE SENT OUT | READING FILE SPECIFICATION | PC → FAX |
| DATA READ | SIZE OF DATA TO BE ACCEPTED | DATA (IMAGE, CHARACTER) | PC ← FAX |
| FILE INFORMATION REQUEST | SIZE OF DATA TO BE ACCEPTED, COMMAND TYPE, FILE ID RAGE SPECIFICATION | FILE INFORMATION | PC ← FAX |
| FILE DELETE REQUEST | SIZE OF DATA TO BE SENT OUT | SPECIFICATION OF FILE TO BE DELETED | PC → FAX |
| STATUS REQUEST | SIZE OF DATA TO BE ACCEPTED | CAUSES OF ABNORMALITY | PC ← FAX |

FIG. 18

| TYPE OF COMMAND | COMMAND PHASE PARAMETER | DATA PHASE PARAMETER | FLOW OF DATA |
|---|---|---|---|
| SESSION OPEN | SIZE OF DATA TO BE SENT OUT | ADDRESS INFORMATION, TERMINAL PERFORMANCE | PC --> FAX |
| REQUEST FOR INFORMATION ABOUT PARTNER TERMINAL | SIZE OF DATA TO BE ACCEPTED | ID OF PARTNER TERMINAL, TERMINAL PERFORMANCE | PC <-- FAX |
| SESSION CLOSE | NO | NO | |
| COMMUNICATION RESULT REQUEST | SIZE OF DATA TO BE ACCEPTED, COMMAND TYPE | COMMUNICATION RESULT INFORMATION | PC <-- FAX |
| COMMUNICATION STOP | NO | NO | |
| FILE INFORMATION REQUEST | SIZE OF DATA TO BE ACCEPTED, COMMAND TYPE | INFORMATION ON FILE TO BE RECEIVED | PC <-- FAX |
| TRANSMISSION REQUEST | SIZE OF DATA TO BE SENT OUT | INFORMATION ON FILE TO BE TRANSMITTED, COMMUNICATION METHOD, ADDRESS INFORMATION | PC --> FAX |
| RECEPTION REQUEST | SIZE OF DATA TO BE SENT OUT | COMMUNICATION METHOD, ADDRESS INFORMATION | PC --> FAX |
| POLLING RECEPTION REQUEST | SIZE OF DATA TO BE SENT OUT | COMMUNICATION METHOD, ADDRESS INFORMATION | PC --> FAX |

FIG. 19

| TYPE OF COMMAND | COMMAND PARAMETER | DATA |
|---|---|---|
| FILE ID LIST REQUEST | NO | FILE ID LIST |
| INDIVIDUAL FILE INFORMATION REQUEST | FILE ID, PAGE | FILE INFORMATION |
| UP-TO-DATE FILE INFORMATION REQUEST | NO | FILE INFORMATION |

FIG. 20

| FILE INFORMATION | PARAMETER |
|---|---|
| FILE TYPE | · FILE INPUTTED FROM SCANNER<br>· FILE TRANSFERRED FROM HOST COMPUTER AND STORED IN MEMORY<br>· FILE IN WHICH FACSIMILE IS RECEIVED |
| FILE ATTRIBUTES | · IMAGE FILE (RAW IMAGE, MMR, MR, MH, INTERMEDIATE CODE)<br>· CHARACTER FILE (ASCII, JIS, IA5) |
| NUMBER OF PAGES | · INTEGER |
| FILE ID | · INTEGER |
| NUMBER OF BYTES OF PAGE DATA | · INTEGER |
| IMAGE SIZE | · A5, A4, A3, B5, B4, LETTER, LEGAL |
| MAIN SCCANNING RESOLUTION | · 400ppi, 300ppi, 200ppi |
| SUB-SCANNING RESOLUTION | · 400ppi, 300ppi, 200ppi, 100ppi |

FACSIMILE APPARATUS USING A SMALL COMPUTER SYSTEM INTERFACE

This application is a division of application Ser. No. 08/337,234 filed Nov. 4, 1994, U.S. Pat. No. 5,684,607 which is a continuation of application Ser. No. 07/889,199, filed May 28, 1992, abandoned.

BACKGROUND OF THE INVENTION

1. Field of the Invention

The present invention relates to a facsimile apparatus. More particularly, the present invention relates to a facsimile apparatus which realizes various kinds of applications by controlling a scanner, printer, image memory, line control section or the like, which constitute the facsimile apparatus, by means of an external host computer.

2. Description of the Related Art

Hitherto, systems have been developed which realize various kinds of applications by controlling a scanner, printer, memory and line control section provided in a facsimile apparatus by means of a host computer. Conventional RS-232C and GPIB interfaces are used therein as interfacing techniques for connecting the facsimile apparatus to the host computer.

However, in the above-described prior art, there are operational problems in that there is a limitation on the data transfer speed because interface techniques, such as RS-232C or GPIB, are used, and that it takes too much time to transfer images.

In addition, there is a drawback in that, since there is a limitation on the data transfer speed, the host computer cannot realize various kinds of applications by controlling the scanner, printer, memory, line control section or the like provided in the facsimile apparatus.

SUMMARY OF THE INVENTION

The present invention has been achieved to solve the above-mentioned problems of the prior art.

An object of the present invention is to provide a facsimile apparatus which is capable of increasing the speed at which data is transferred between a host computer and a facsimile apparatus and of effectively utilizing a scanner, printer, memory, line control section or the like provided in the facsimile apparatus by instructions from the host computer by using the small computer system interface (SCSI) for interfacing a host computer with a facsimile apparatus. This is a conventional interface whose description is published, for example by the American National Standards Institute at ANSI X3.131-1986.

Another object of the present invention is to provide a facsimile apparatus which is capable of storing images read by the image reading section of the facsimile apparatus as files in the host computer and capable of controlling the transmission and recording thereof upon instructions from the host computer.

A further object of the present invention is to provide a facsimile apparatus which is capable of entering images from a host computer into the memory of the facsimile apparatus and is capable of controlling the transmission and recording of the entered images under instructions from the host computer.

A still further object of the present invention is to provide a facsimile apparatus in which a host computer, connected to a facsimile apparatus, which is capable of controlling the facsimile apparatus, obtains information on the apparatus with which it communicates from said facsimile apparatus and thereafter instructs the facsimile apparatus to transmit or receive images.

A still further object of the present invention is to provide a facsimile apparatus which is capable of notifying the host computer of information on images stored in the facsimile apparatus in a data format selected by the host computer from among a plurality of data formats.

Objectives and advantages in addition to those discussed above shall be apparent to those skilled in the art from the description of the preferred embodiment of the invention which follows. In the description, reference is made to the accompanying drawings, which form a part hereof, and which illustrate an example of the invention. Such example, however, is not exhaustive of the various embodiments of the invention, and therefore reference is made to the appended claims for determining the scope of the invention.

BRIEF DESCRIPTION OF THE DRAWINGS

FIGS. 5-1 and 5-2 are flowcharts which illustrate in detail operations for processing various kinds of commands to a scanner unit 6 in step S308 shown in FIG. 3;

FIGS. 6-1 and 6-2 are flowcharts which illustrate printer command processing;

FIGS. 7-1, 7-2, 7-3 and 7-4 are flowcharts which illustrate image command processing;

FIGS. 8-1, 8-2, 8-3 and 8-4 are flowcharts which illustrate operations concerning communication command processing;

FIGS. 12-1 and 12-2 are flowcharts which illustrate an operation concerning a call polling procedure;

FIG. 14 is a table which lists a group of parameters for a logic unit command;

FIG. 15 is a table which lists a group of parameters for a scanner unit command;

FIG. 16 is a table which lists a group of parameters for a printer unit command;

FIG. 17 is a table which lists a group of parameters for an image unit command;

FIG. 18 is a table which lists a group of parameters for a communication unit command;

FIG. 19 is a table which shows a file information request command; and

FIG. 20 is a table which lists file information parameters.

DETAILED DESCRIPTION OF THE PREFERRED EMBODIMENTS

Preferred embodiments of the present invention will be explained below in detail with reference to the accompanying drawings.

Figure 1:
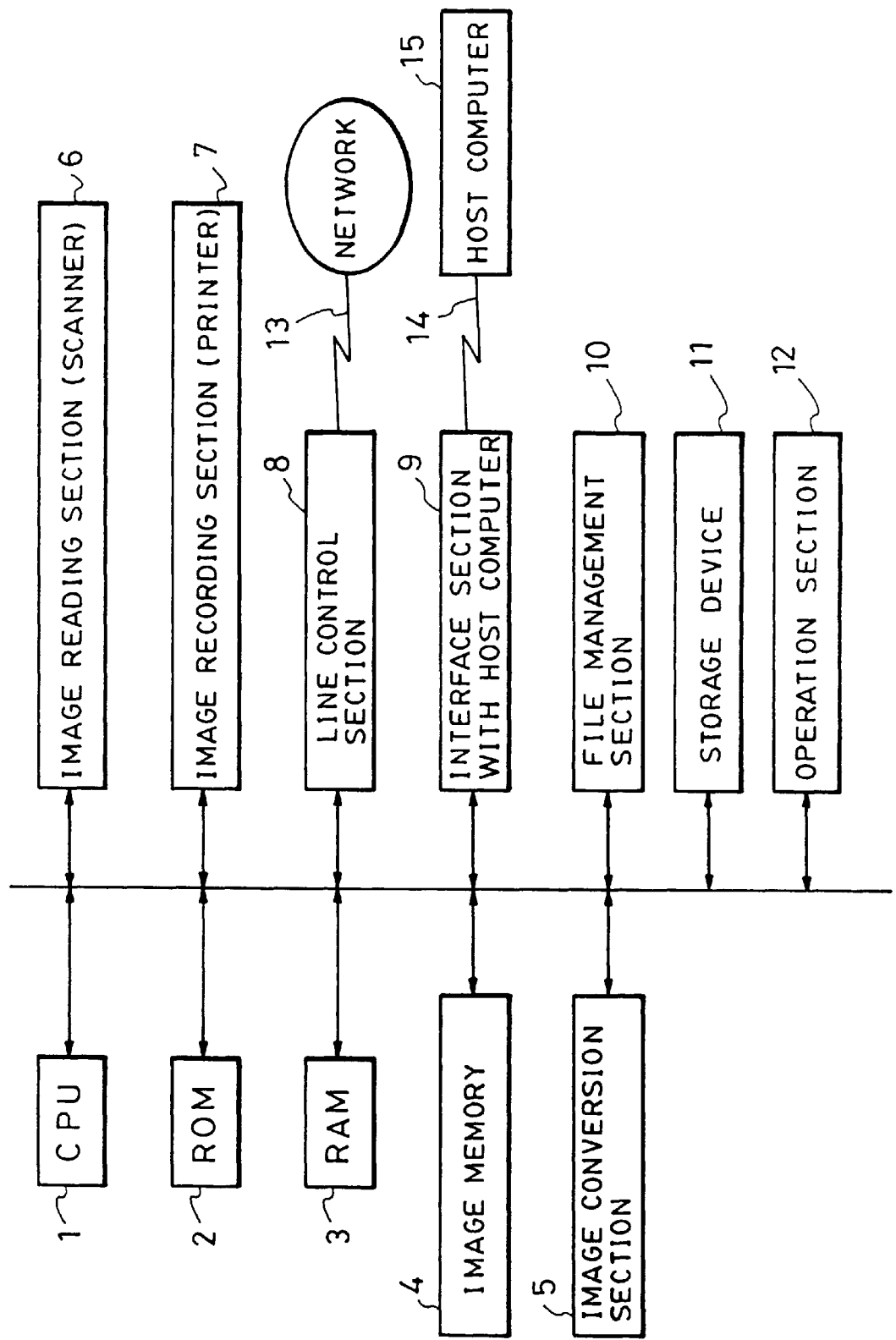
FIG. 1 is a block diagram illustrating the entire construction of a facsimile apparatus according to an embodiment of the present invention.

FIG. 1 is a block diagram illustrating the entire construction of a facsimile apparatus (hereinafter referred to as an apparatus) according to an embodiment of the present invention. In this figure, a CPU 1 controls the entire apparatus in accordance with control programs stored in a ROM 2. Work areas and control data are temporarily stored in a RAM 3. An image memory 4 is a memory through which image data is handled. An image conversion section 5 converts resolution, paper size, and an encoding method.

In this apparatus, an original document (image) is read by an image reading section such as a scanner 6 and printed out by an image recording section such as a printer 7. Communication protocols between this apparatus and a communication network are controlled by a line control section 8. Communication protocols between this apparatus and a host computer 15 are controlled by an interface section 9 with a host computer. In the present invention, a small computer system interface (SCSI) is used as an interface. SCSI is an interface by which data can be transferred at a speed higher than that by RS-232C or GPIB.

A file management section 10 manages documents created inside a facsimile apparatus, and the documents are stored in a storage apparatus 11. Operations of the facsimile apparatus are performed by an operation section 12. The line control section 8 is connected by a dedicated cable 13 to the network, and the interface section 9 with a host computer is connected by a dedicated cable 14 to the host computer 15.

A detailed explanation will now be given about the control of a facsimile apparatus according to this embodiment. Since operations, such as transmission, reception, or copying, and methods employed in a facsimile apparatus, are well known, the explanation thereof is omitted here.

Thus, only the control of this apparatus from outside via the interface 9 with a host computer will be described below in detail.

Figure 2:
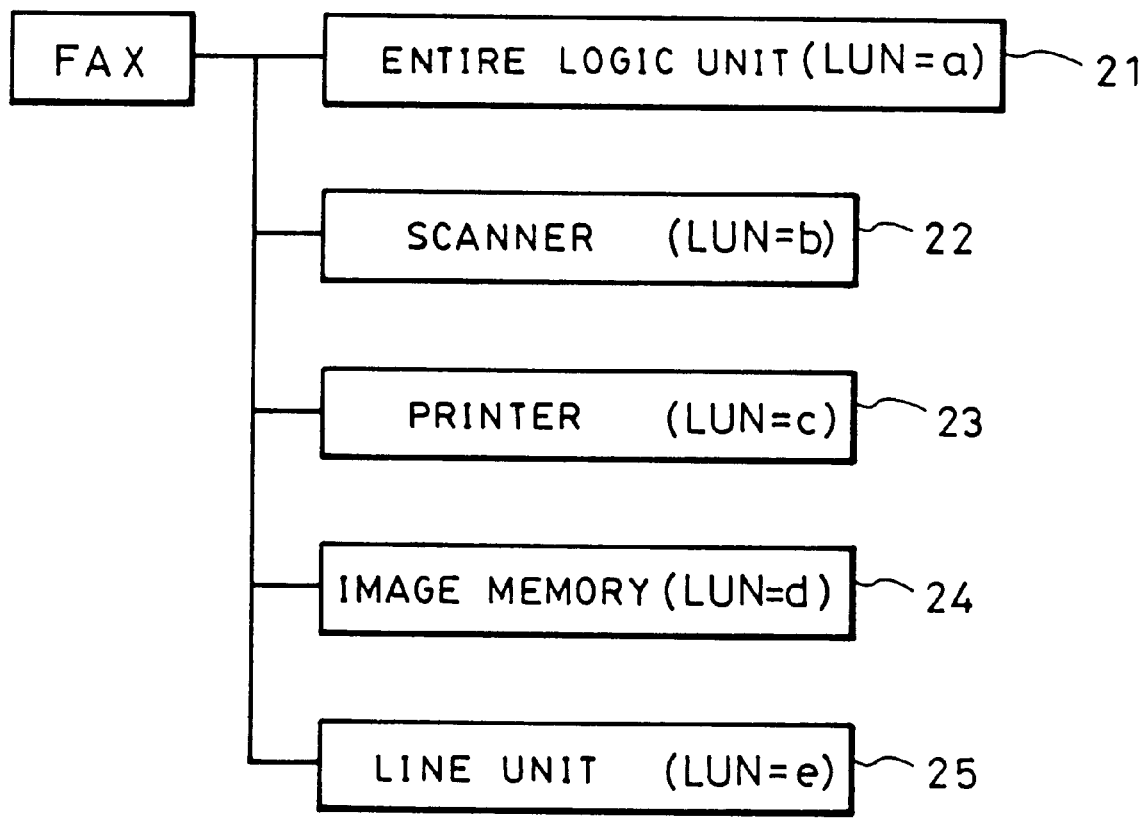
FIG. 2 is a block diagram which illustrates an example in which logic units are assigned to the blocks which constitute the facsimile apparatus according to this embodiment of the present invention.

FIG. 2 illustrates an example in which logic units are assigned to the blocks which constitute the facsimile apparatus. In this figure, an entire logic unit 21 is a unit in which the entire facsimile apparatus is considered as one unit. In a scanner 22, a printer 23, an image memory 24, and a line unit 25, a logic ID (LUN: logic unit number) is set thereto with reference to a scanner section, a printer section, an image memory section, and a line control section respectively which comprise a functional block. In this embodiment, a specific command is set to each of these units so that the functions of each unit are utilized to their fullest and the burden on the host computer 15 is minimized.

Next, functions provided in the units will be described unit by unit.

Figure 3:
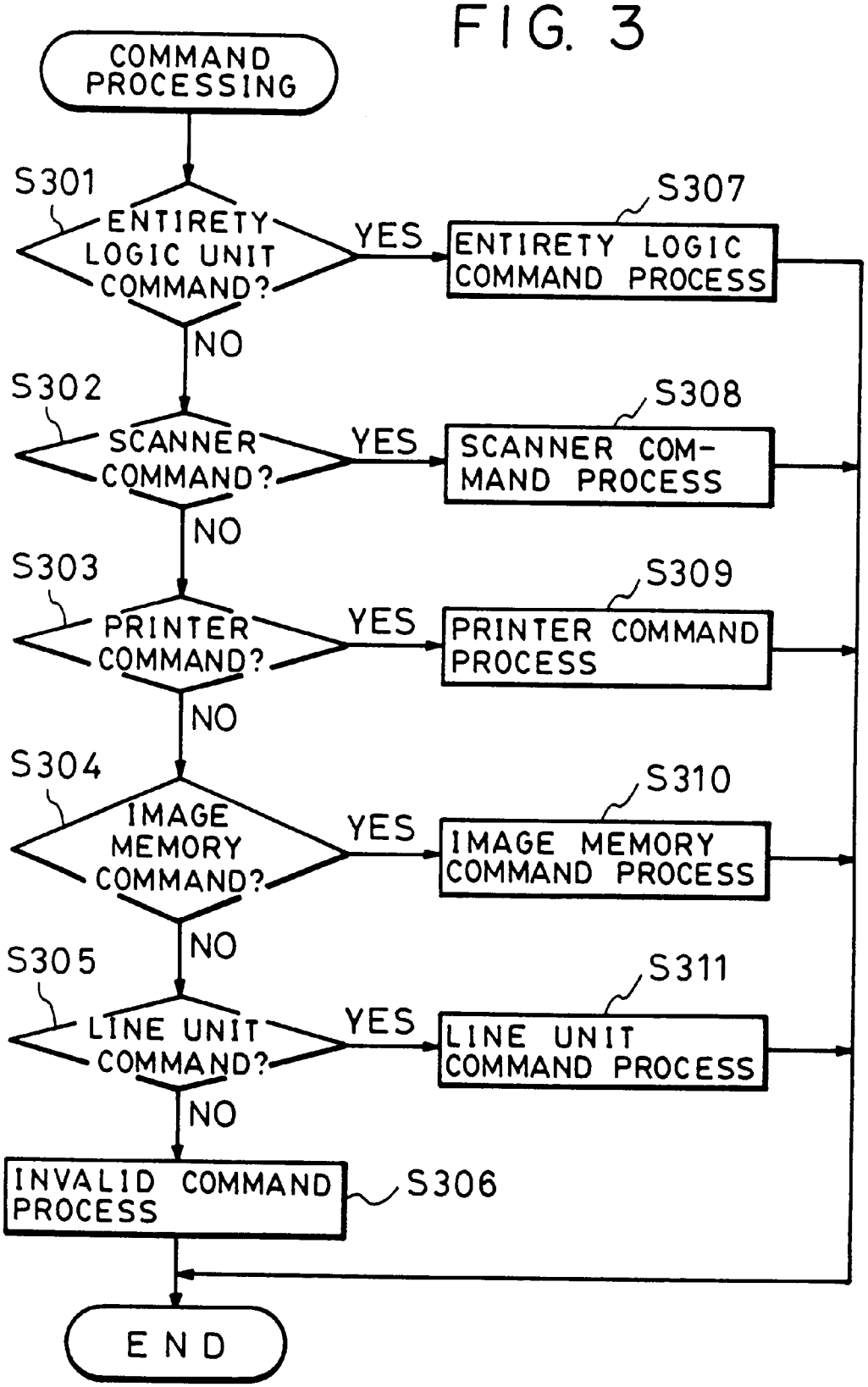
FIG. 3 is a flowchart which illustrates the outline of processing commands inputted from an interface 9 with a host computer.

FIG. 3 is a flowchart which illustrates the outline of processing commands inputted from an interface 9 with a host computer. The CPU 1 processes commands in accordance with this flowchart. In this figure, in steps S301 to S305, a check is made, for example from the LUN, to determine to which unit a command is issued. In steps S307 to S311, a command process for each unit is performed on the basis of the determination results of steps S301 to S305, respectively. Step S306 concerns a step for a case in which invalid commands, such as undefined commands, are input, but this step is basically not performed.

<Entire Logic Unit Command Processing>

Figure 4:
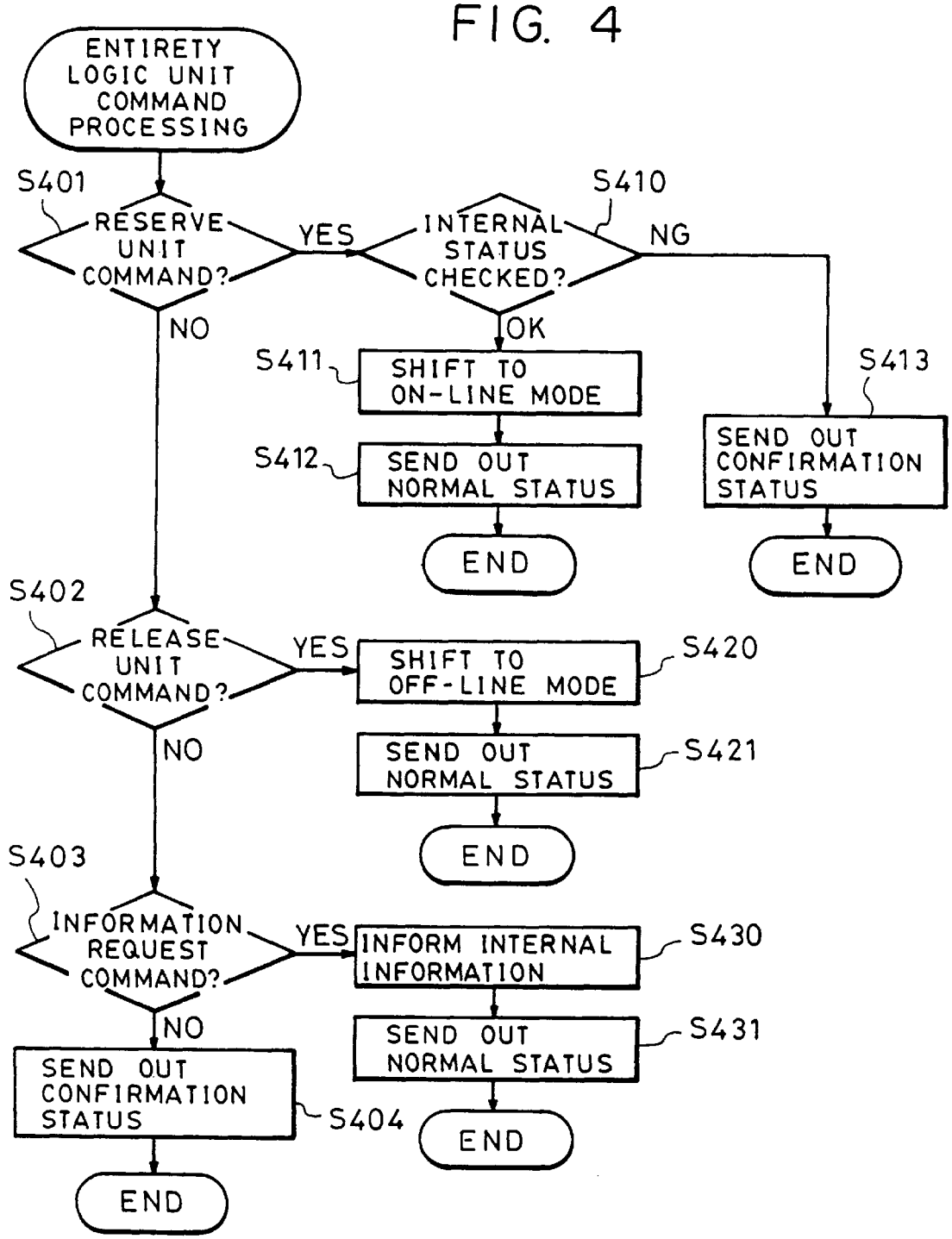
FIG. 4 is a flowchart which illustrates in detail operations for processing an entire logic unit command in step S307 shown in FIG. 3.

FIG. 4 is a flowchart which illustrates in detail operations for processing an entire logic unit command in step S307 shown in FIG. 3.

(Processing of Reserve Unit Command)

The reserve unit command is a command which should be issued first when the facsimile apparatus is controlled by the host computer 15 so as to fully use the functions of the facsimile apparatus. The facsimile apparatus, upon reception of this command, checks the internal operating state or the like, and notifies the facsimile apparatus of any change in status depending upon whether the facsimile apparatus can follow the control by the host computer 15 from this time on.

In this embodiment, after the reserve unit command is processed normally, it is called an "On-Line" mode. In the On-Line mode, processing of commands from the host computer takes precedence over operations from the operation section 12. To explain more specifically, when it is determined in step S401 shown in FIG. 4 that the command is a reserve unit command, the internal state of the facsimile apparatus is checked in step S410. If the facsimile apparatus is not in a state in which various kinds of control commands from the host computer 15 can be executed, a confirmation of this status is sent out in step S413 (a check condition status is sent out on the basis of SCSI protocols). When the confirmation of the status is sent out, the cause thereof can be determined when the host computer 15 issues an information request command.

When the result of internal status check is "OK" in step S410, the facsimile apparatus shifts to the On-Line mode, and an operation for displaying the status on the operation section 12 is performed, and the setting of internal control status is performed. In the subsequent step S412, an operation for sending out a confirmation of a normal status indicating that the reserve unit command processing has been terminated normally is performed (a good status on the basis of SCSI protocols is sent out).

(Processing of Release Unit Command)

This command is used to shift from the state in which the facsimile apparatus is placed 4n the On-Line mode by the reserve unit and processing commands from the host computer 15 takes precedence over operations from the operation section 12 to the Off-Line mode in which the facsimile apparatus is operated as an ordinary facsimile apparatus.

When it is determined in step S402 that the command is a release command, an operation for shifting to the Off-Line mode is performed in step S420. When the command from the host computer 15 is being executed, the execution is stopped, the internal status is shifted to the Off-Line mode, and a confirmation of a normal status is sent out in step S421. Thus, the operation is terminated.

(Processing of Information Request Command)

This command is used not only to notify the host computer of the functions that this apparatus has, but to notify it of the cause of an abnormality when a confirmation status is sent out.

When it is determined in step S403 that the command is an information request command, in step S430, the facsimile apparatus performs an internal information notification operation for notifying the host computer of the type of model, version, terminal performance, and the cause of abnormality. In the subsequent step S431, a confirmation of a normal status is sent out, terminating the command processing.

In step S404, an operation for a case in which a command which is undefined for the entire logic unit is received is performed, and a confirmation of this status is sent out. A list of a parameter group used for the entire logic unit is shown in FIG. 14. In FIG. 14, reference character PC denotes the host computer 15.

<Scanner Command Processing>

Figures 1, 5:
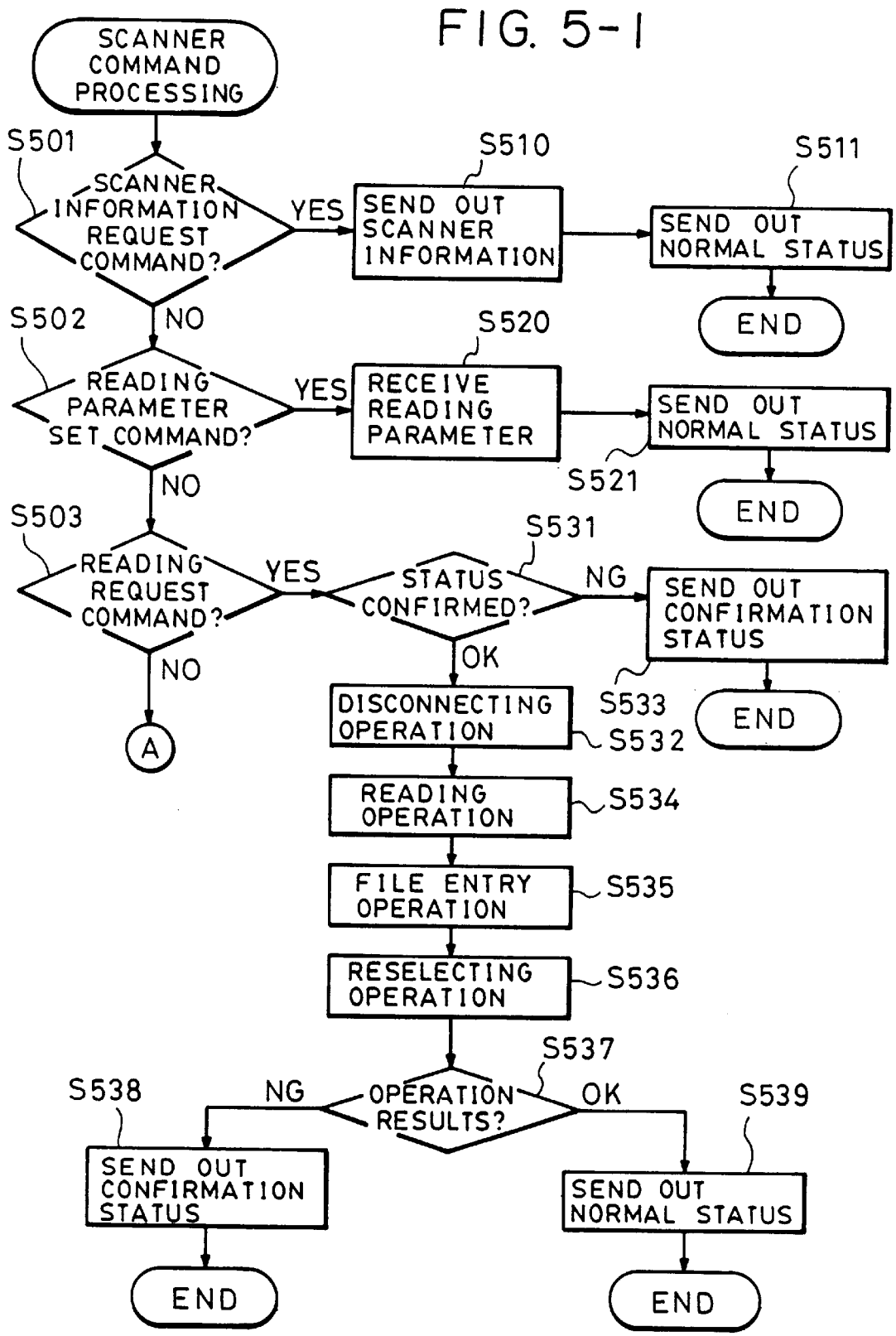
Figures 2, 5:
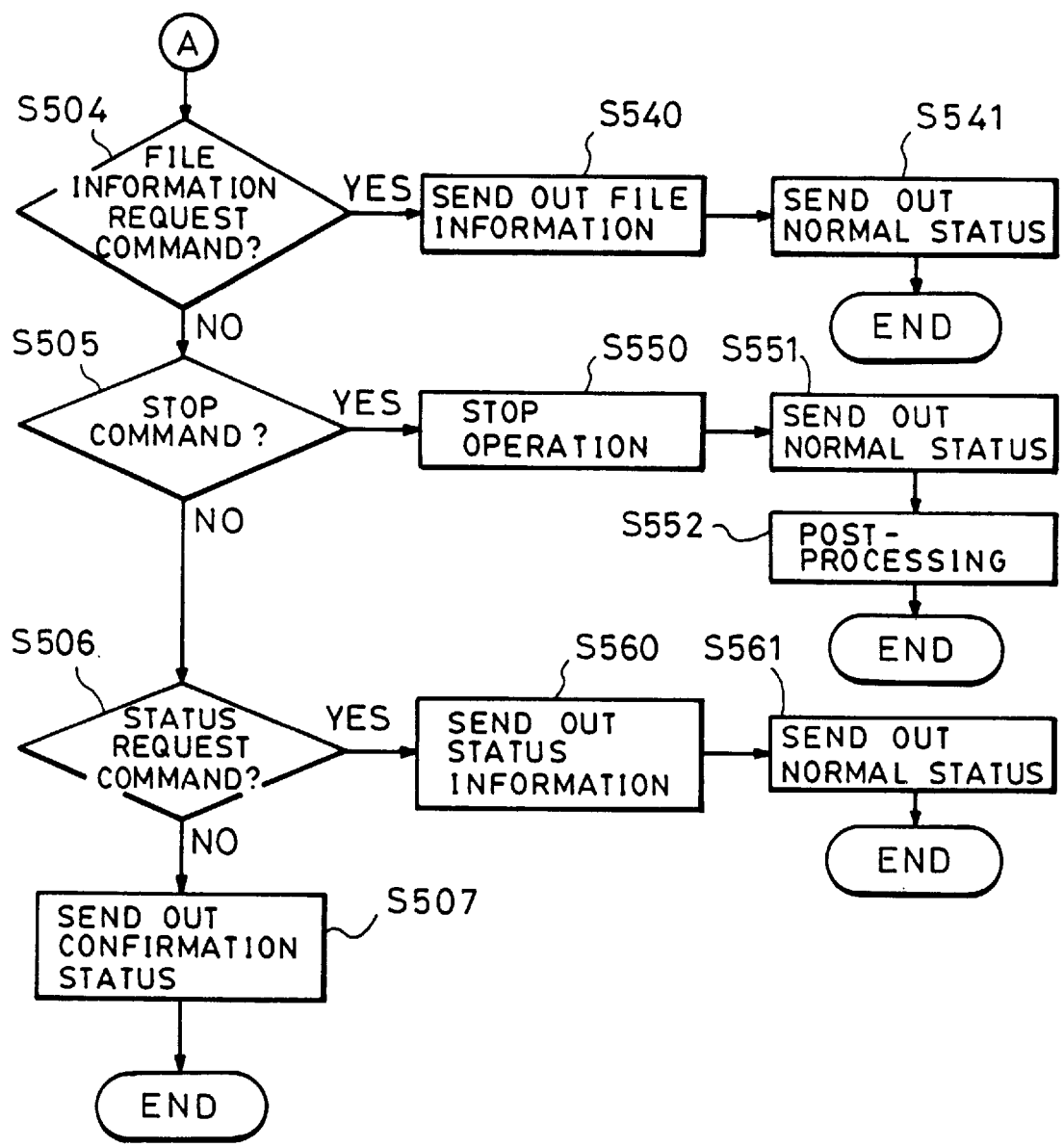

FIGS. 5-1 and 5-2 are flowcharts which illustrate in detail operations for processing various kinds of commands for the scanner unit 6 in step S308 shown in FIG. 3. FIG. 15 is a table which lists a group of parameters used for the scanner unit command.

(Processing of Scanner information Request Command)

This command is used to notify the host computer of information about the scanner unit 6, such as the presence or absence, or size of an original document, or the presence or absence of any defects.

When it is determined in step S501 shown in FIG. 5-1 that the command is a scanner information request command, the scanner information shown in FIG. 15 is sent to the host computer in step S510, and a confirmation of a normal status regarding this operation is sent out in step S511. This terminates the series of operations.

(Processing of Reading Parameter Setting Command)

This command is used to receive the designation of the reading mode before a reading request command is received. The designation of a reading mode includes the setting of the resolution, the encoding method and the like. Regarding processing, when it is determined in step S502 that the command is a reading parameter setting command, a predetermined parameter shown in FIG. 15 is received in step S520, and a confirmation of a normal status regarding this operation is sent out in step S521. Thus, the operation is terminated.

(Processing of Reading Request Command)

This command is used to read an original document set in a scanner after the aforesaid reading parameter setting command is received, and to store image data in the storage apparatus 11 inside the facsimile apparatus.

When it is determined in step S503 that the command is a reading request command, a check is made of the status of the scanner unit 6 and whether or not the reading parameter has been set. When it has not been set, the scanner is operated using a default value. If the apparatus is in a mode in which the reading operation cannot be performed, a confirmation of this status is sent out in step S533, terminating the operation. If the reading operation can be performed, the apparatus is disconnected in step S532 so that the logical connection with the host computer is temporarily released and the apparatus is switched to a mode in which other commands (particularly a stop command) can be received. Next, a reading operation is performed in step S534 by using the functions of the facsimile apparatus. In the subsequent step S535, an operation for entering and storing a file is performed by the file management section 10.

Thus, the image can be read by the scanner inside the facsimile apparatus after the resolution, encoding method or the like are specified by the host computer. Furthermore, the image can be filed. After the file entry operation is completed, a reselecting operation is performed in step S536 so that the logical connection with the host computer is made again. Thereafter, in step S537, a check is made to determine whether the reading operation has been terminated normally or abnormally. If the reading operation has been terminated abnormally, a confirmation of this status is sent out in step S538. If the reading operation has been terminated normally, a confirmation of a normal status is sent out in step S539. This terminates the series of operations.

(Processing of File Information Request Command)

This command is used to notify the host computer of file information created as a result of executing the reading request command, for example, a file management ID, file size, or the like.

Regarding processing, when it is determined in step S504 in FIG. 5-2 that the command is a file information request command, file information is sent out in step S540.

In the subsequent step S541, a confirmation of a normal status regarding this operation is sent out. This terminates the operation.

(Processing of Stop Command)

This command is used to stop a reading operation in response to receiving a reading request command when the apparatus is reading an original document. When it is determined in step S505 that the command is a stop command, the reading operation is stopped in step S550. A confirmation of a normal status regarding this operation is sent out in step S551 to notify the host computer that the stop command has been executed. Postprocessing, incidental to the discontinuation of the reading operation, is performed in step S552. This terminates the operation.

(Processing of Status Request Command)

This command is issued after a confirmation status regarding other scanner command processing is sent out and used to notify the host computer of the reasons why the confirmation of this status has been issued.

Regarding processing, when it is determined in step S506 that the command is a status request command, predetermined status information is sent out in step S560.

A confirmation of a normal status is sent out in step S561. This terminates the operation.

In step S507, when an undefined scanner command is received, a confirmation of this status is sent out.

<Printer Command Processing>

Figures 1, 6:
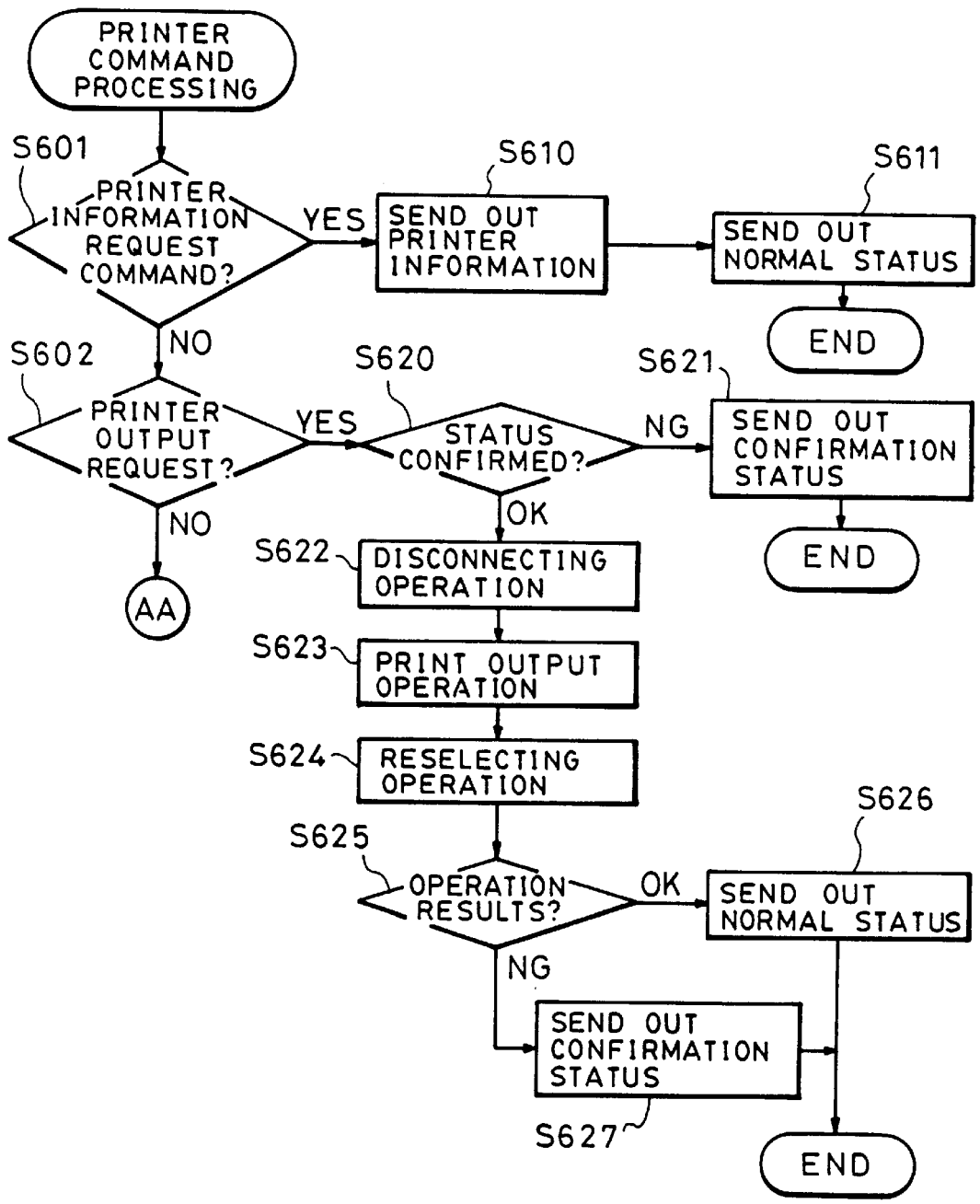
Figures 2, 6:
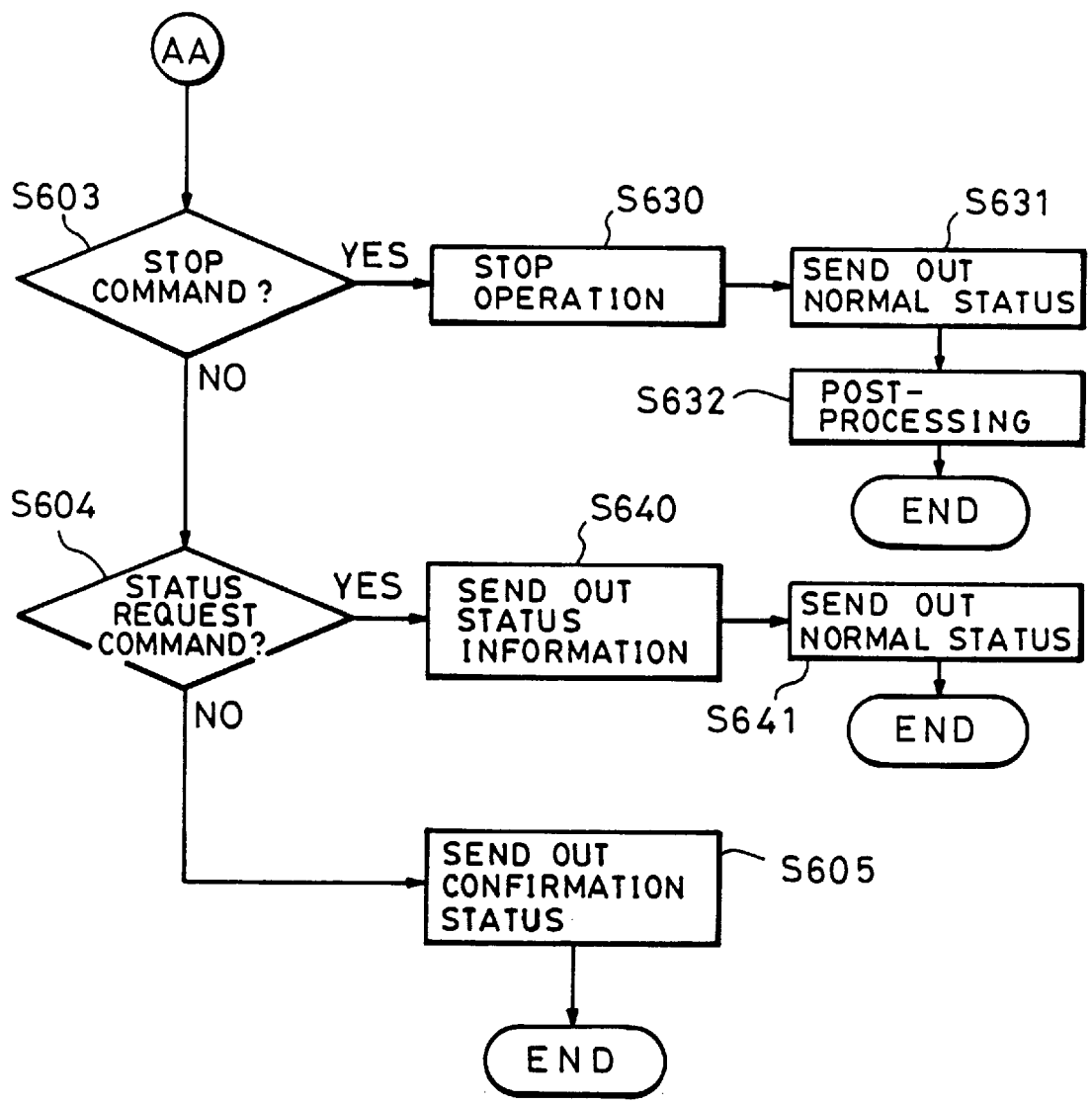

FIGS. 6-1 and 6-2 are flowcharts which illustrate the operation concerning printer command processing. FIG. 16 is a table which lists a group of parameters used for a printer unit command.

(Processing of Printer Information Request Command)

This command is used to notify the host computer of the presence or absence of recording paper, the size thereof, defects, or the like in the printer 7.

When it is determined in step S601 shown in FIG. 6-1 that the command is a printer information request command, the aforesaid presence or absence of recording paper, size thereof, defects and the like are sent out in step S610. In step S611, a confirmation of a normal status is sent out. This terminates the operation.

(Processing of Print-out Request Command)

This command is used to selectively print documents stored in the facsimile apparatus.

When it is determined in step S602 that the command is a print-out request command, a check is made in step S620 of the status of the printer, and the presence or absence of the specified file. If an abnormality is detected, a confirmation of this status is sent out in step S621, terminating the operation. If the confirmation of this status is "OK", the logical connection with the host computer is temporarily disconnected in step S622. In step S623, the specified file is printed out. After printing, the logical connection with the host computer is made again. When the result of the printing-out operation indicates "OK" in the determination step of step S625, a confirmation of a normal status is sent out in step S626. If the result of the printing-out operation indicates "not OK", a confirmation of this status is sent out in step S627. Thus, the operation is terminated.

Thus, documents stored within the facsimile apparatus as files can be output by the printer of the facsimile apparatus under an instruction from the host computer.

(Processing of Discontinue Command)

This command is used to discontinue the execution of a print output request command when the print-out request command is in operation.

When it is determined in step S603 that the command is a discontinue command, an operation for discontinuing the printing is performed in step S630. In step S631, a confirmation of a normal status indicating that this command has been executed is sent out in step S631. Postprocessing incidental to the discontinuation of the execution of the print-out request is performed in step S632. Thus, the series of operations are terminated.

(Processing of Status Request Command)

This command is issued after a confirmation status regarding other scanner command processing is sent out and used to notify the host computer of the reasons why the confirmation status has been issued.

Regarding processing, when it is determined in step S604 that the command is a status request command, predetermined information is sent out in step S640. A confirmation of a normal status is sent out in step S641. This terminates the operation.

In step S605, when an undefined printer command is received, a confirmation of this status is sent out.

<Image Command Processing>

Figures 1, 7:
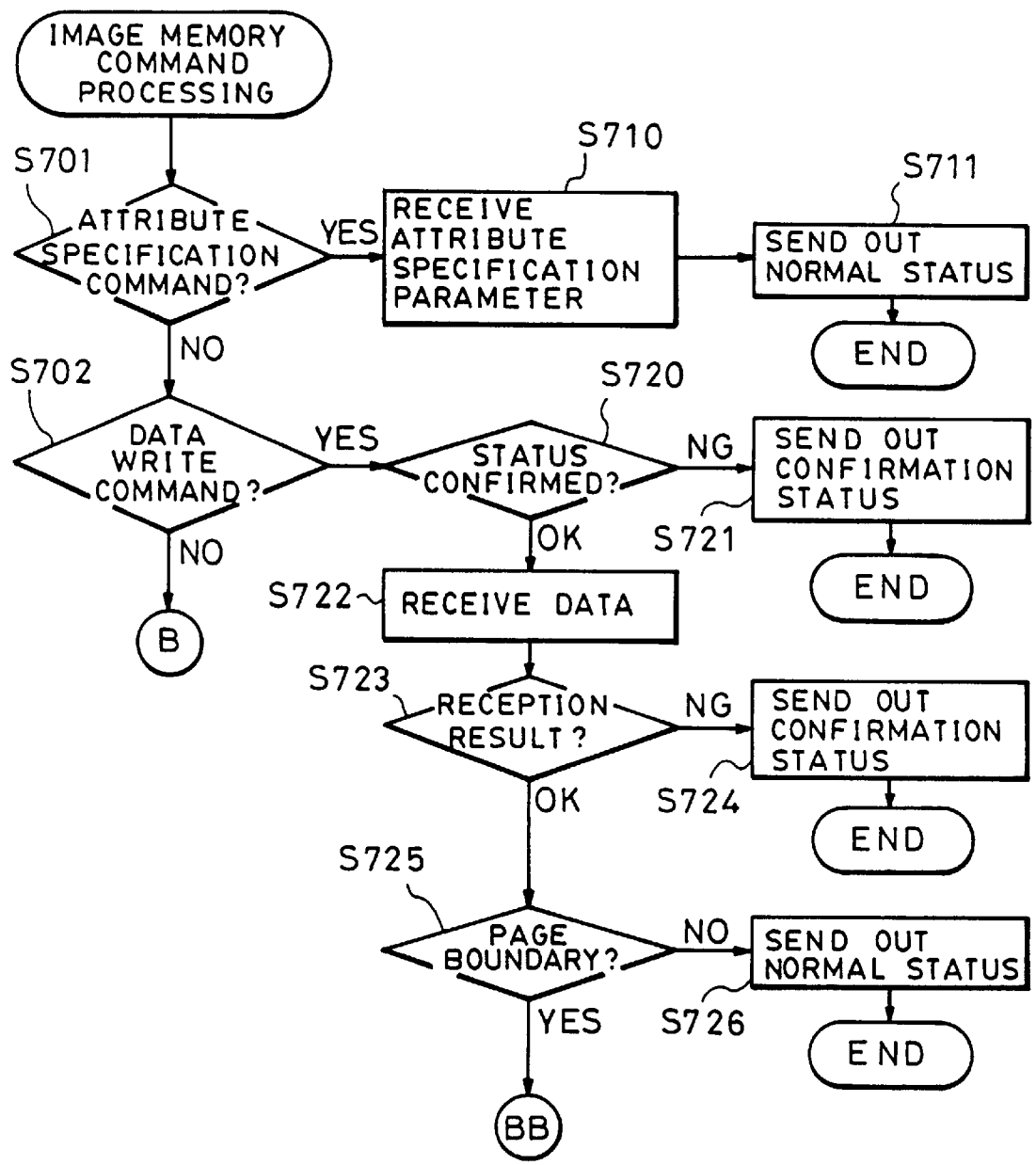
Figures 2, 7:
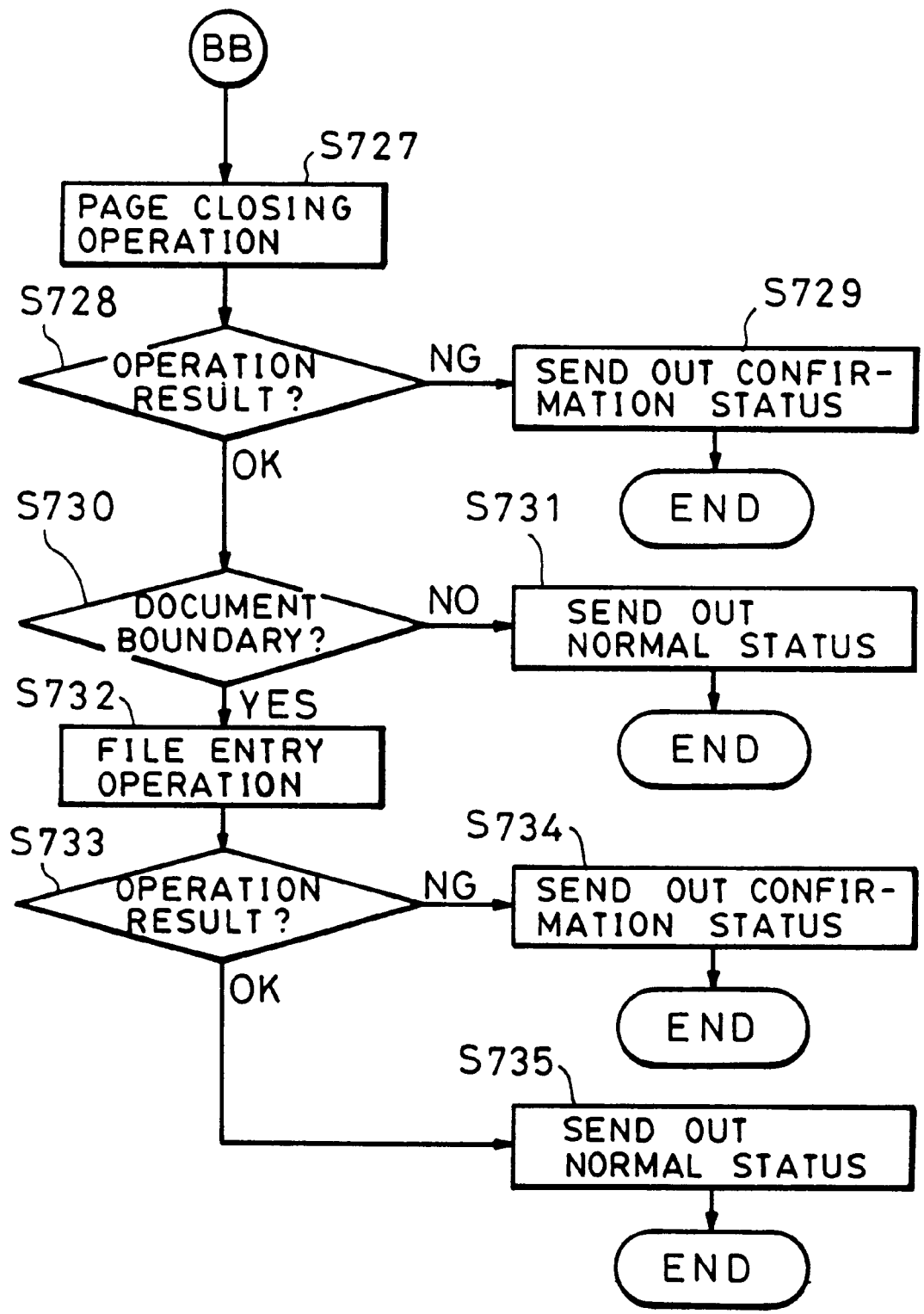
Figures 3, 7:
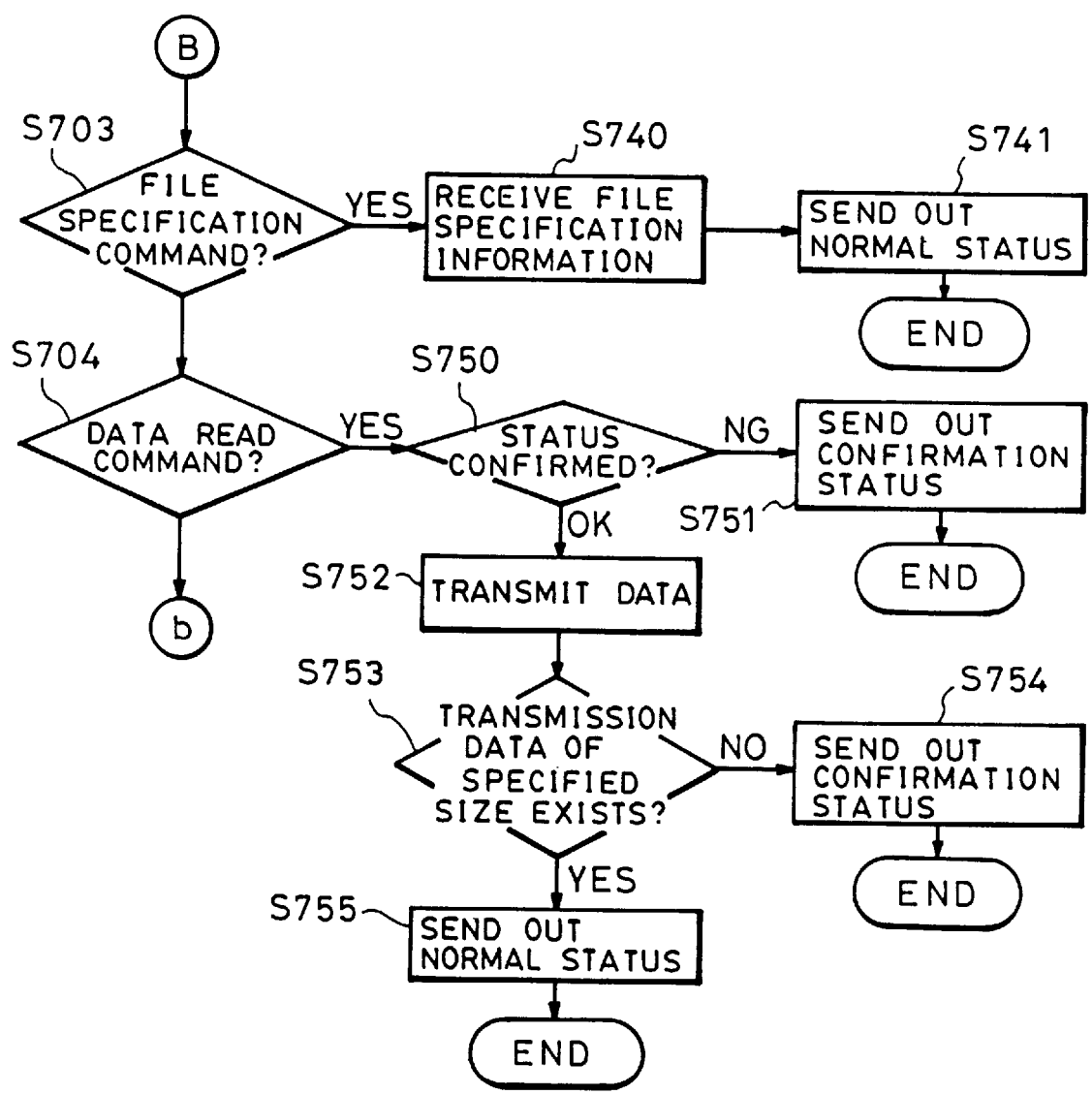
Figures 4, 7:
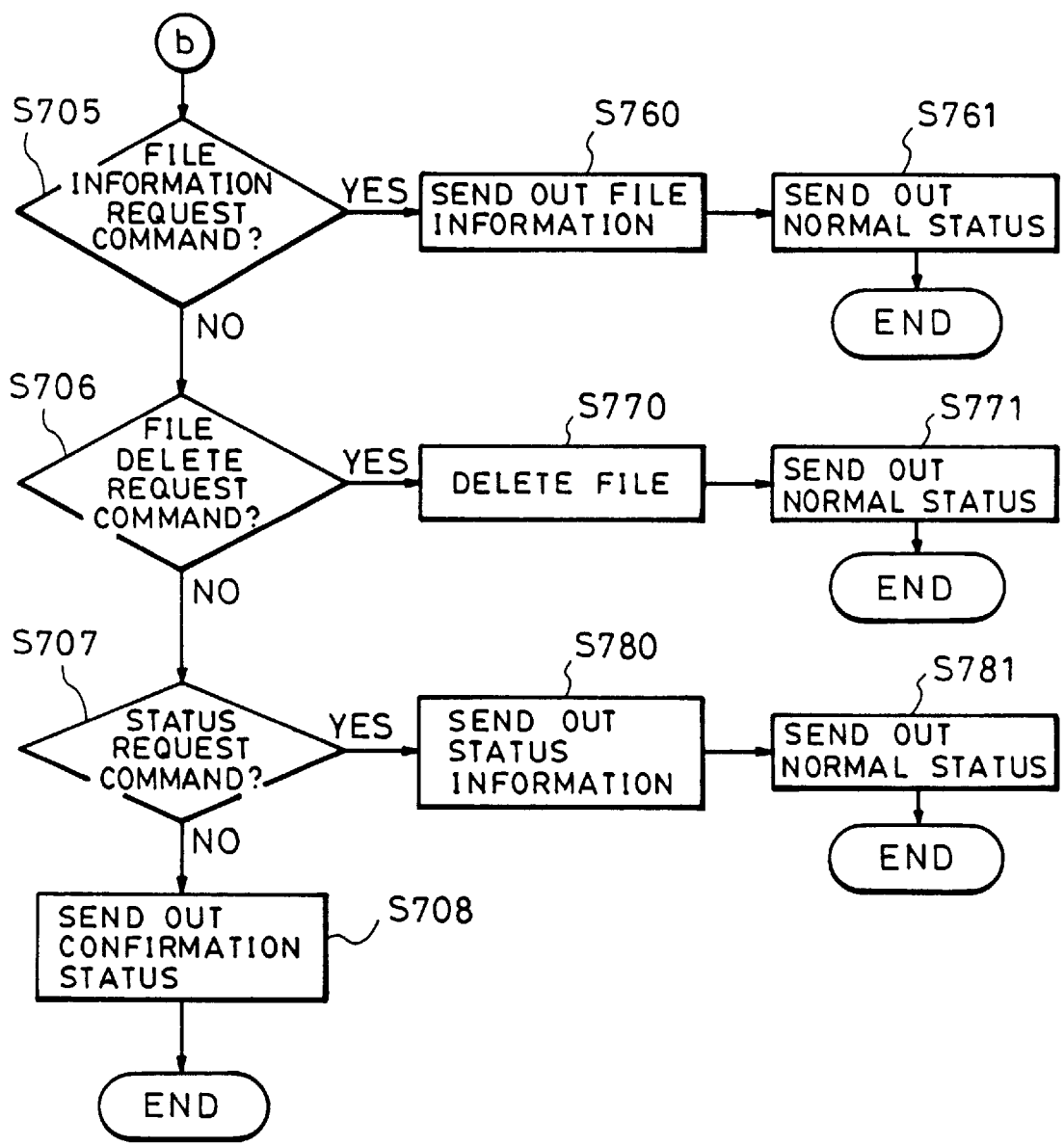

FIGS. 7-1 and 7-2 are flowcharts which illustrate the operation concerning image command processing. FIG. 17 is a table which lists a group of parameters used for the image command.

(Processing of Attribute Specification Command)

This command is used to specify attributes as a file, for example, image size, resolution, an encoding system in the case of image information, or the coding scheme in the case of character data, before a file is created by a data write command which will be described in the next section. This command is also used to store the information as the attributes of the file.

Regarding processing, when it is determined in step S701 shown in FIG. 7-1 that the command is an attribute specification command, an attribute specification command shown in FIG. 17 is received in step S710. A confirmation of a normal status is sent out in step S711. Thus, the operation is terminated.

(Processing of Data Write Command)

This command is used to transfer data from the host computer to the facsimile apparatus when a document file is created within the facsimile apparatus. In this embodiment, it is presupposed that one document is stored in one file, though data of a plurality of pages can be stored with respect to one file. In creating a file, it is in principle necessary that the specification of attributes of the file be declared beforehand by the above-mentioned attribute specification command before the data write command is issued.

In creating a file, there is a possibility that the data write command will be issued two or more times. Flags used to indicate whether the end of one page of data is reached or not, or the end of a file is reached or not, can be specified as parameters within this command. By using these flags, management for each page and for each document can be performed.

Specific operations of the present invention will be explained below with reference to flowcharts.

When it is determined in step S702 shown in FIG. 7-1 that the command is a data write command, the process status within the facsimile apparatus is checked in step S720. This is done to check if the file attributes have been specified by the attribute specification command and if there is a storage capacity sufficient to create a file. If the process status regarding this operation indicated in this step is "not OK", a confirmation of this status is sent out in step S721. This terminates the operation.

At this point, even if there is document data which has already been processed, when the file entry operation in step S732, which will be described later, has not been terminated normally, the data is discarded unconditionally.

When the process status regarding this operation indicated in step S720 is "OK", an operation for inputting document data into the facsimile apparatus is performed in step S722. At this point, if there is an abnormality, such as an insufficient storage capacity, a confirmation of this status is sent out in step S724. This terminates the operation.

If, however, it is determined in step S723 that the operation result is "OK", in step S725, a check is made to determine whether the data is page boundary data. If the data continues as page data, a confirmation of a normal status is sent out in step S726. Then, the facsimile apparatus waits for another data write command to be input.

When the data is page boundary data in step S725, considering the data is determined to be page data, a closing operation under file management is performed in step S727 shown in FIG. 7-2. In the subsequent step S728, a check is made to determine whether the closing operation has been terminated normally. If a problem has occurred, a confirmation of this status is sent out in step S729. If no problem has occurred, a check is made to determine whether the end of data in a document file has been reached.

When the page data continues to be sent, as the data is determined to be not document boundary in step S730, a confirmation of a normal status is sent out in step S731, and the apparatus waits for a new data write command. When, on the contrary, the end of the data has been reached as a document, the data is entered as a file in step S732. If it is determined in step S733 that the operation has been terminated normally, a confirmation of a normal status is sent out in step S735. If, however, it is determined in step S733 that the operation has been terminated abnormally, a confirmation of this status is sent out in step S734. This terminates the operation.

(Processing of File Designation Command)

This command is used to designate a file to be transferred before a data read command is issued, which data read command is an execution command used to transfer document data stored in the facsimile apparatus to the host computer.

When it is determined in step S703 shown in FIG. 7-3 that the command is a file designation command, predetermined file designation information is received in step S740. In the subsequent step S741, a confirmation of a normal status regarding this operation is sent out. This terminates the operation.

(Processing of Data Read Command)

This command is used to transfer data of the file which is previously designated by the aforesaid file designation command to the host computer.

When it is determined in step S704 that the command is a data read command, the internal status regarding this file data transfer operation is checked in step S750. When the status indicates "not OK", a confirmation of this status is sent out in step S751. This terminates the operation. When, on the contrary, the status is "OK", the data is transferred in step S752. In the subsequent step S753, if there is no data to be transferred in a state in which a specified number of transfer bytes has not been reached, a confirmation of this status is sent out in step S754, and the operation is terminated. If there is data to be transferred, a confirmation of a normal status is sent out in step S755, and the operation is terminated.

(Processing of File Information Request Command)

This command is used to notify the host computer of information on files stored in the facsimile apparatus. In this embodiment, three command types are prepared for requesting file information. The host computer is notified of information corresponding to each of the three command types. These commands are shown in FIG. 19.

When the command type is "file ID list request", a list of IDs of files stored within the facsimile apparatus is notified as information to the host computer. When the command type is "individual file information request", as a predetermined file ID and page numbers are specified by the host computer, file information shown in FIG. 20 is notified to the host computer on the basis of the specification. When the command type is "up-to-date file information request", information on the file which is most recently created is notified to the host computer in the format shown in FIG. 20.

The file information request command is prepared for the scanner command, the image memory command, and a communication command. When the command type is "up-to-date file information request", information on their most recently created file, which is created when a reading request command, a data write command, or a reception request command (including a polling reception command) is executed, is notified to the host computer. As set forth above, in this embodiment, information stored in the facsimile apparatus can be retrieved in a format in which the host computer can easily use the information. Regarding processing, when it is determined in step S705 shown in FIG. 7-4 that the command is a file information request command, file information corresponding to the command types described above is sent out to the host computer in step S760. In step S761, a confirmation of a normal status regarding this operation is sent out, and the operation is terminated.

(Processing of File Delete Request Command)

This command is used to delete a specified file. When it is determined in step S706 that the command is a file delete request command, a specified file is deleted in step S770. In step S771, a confirmation of a normal status regarding this operation is sent out, and the operation is terminated. When the specified file does not exist, the process proceeds to the next step where a confirmation of a normal status is sent out.

(Processing of Status Request Command)

This command is issued when a confirmation status regarding other image memory command processing is sent out and used to notify the host computer of the reasons why the confirmation status is sent out.

When it is determined in step S707 that the command is a status request command, predetermined information is sent out in step S780. In step S781, a confirmation of a normal status is sent out and the operations is terminated. In step S708, when an undefined image memory command is received, a confirmation of this status is sent out.

<Communication Command Processing>

Figures 1, 8:
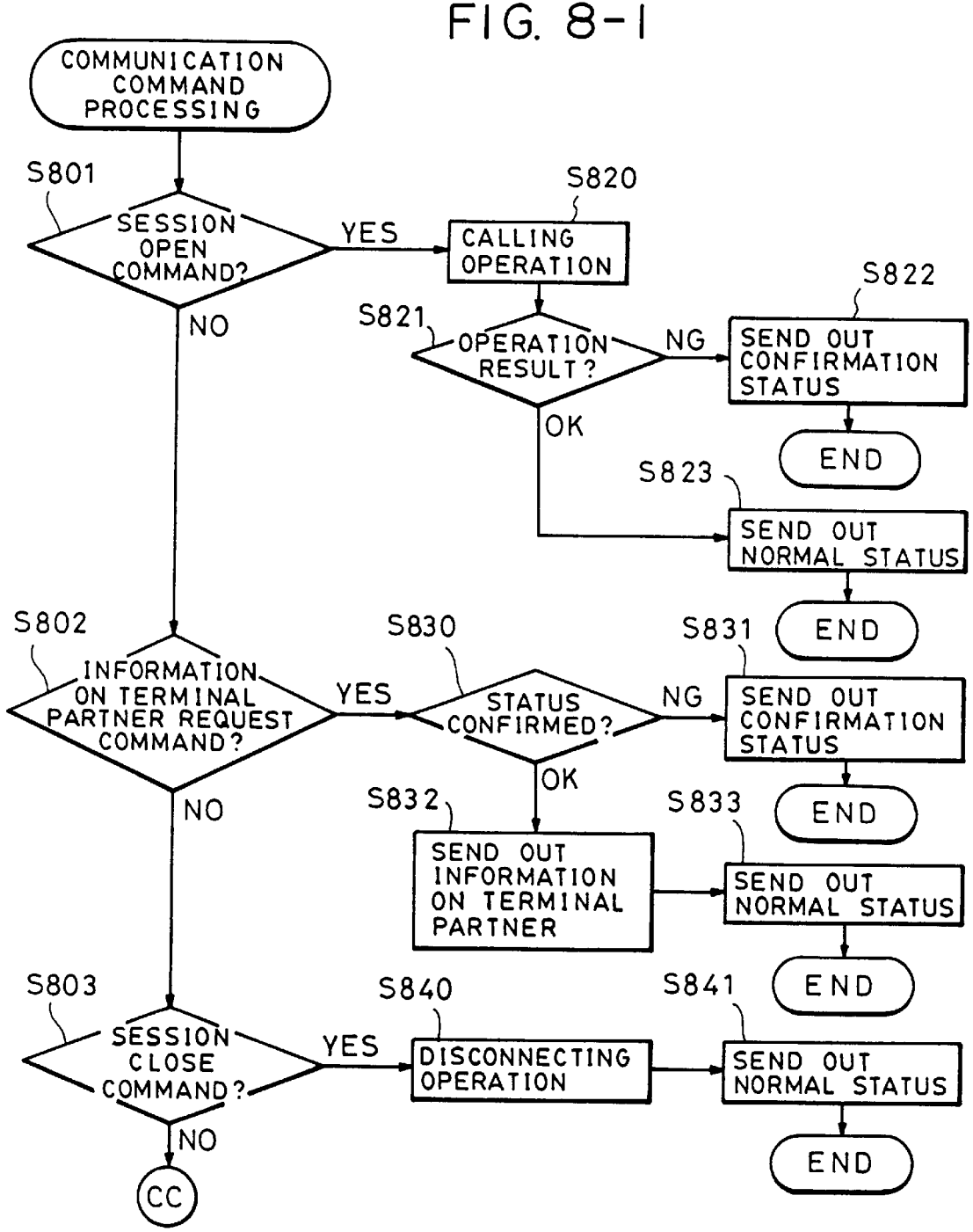
Figures 2, 8:
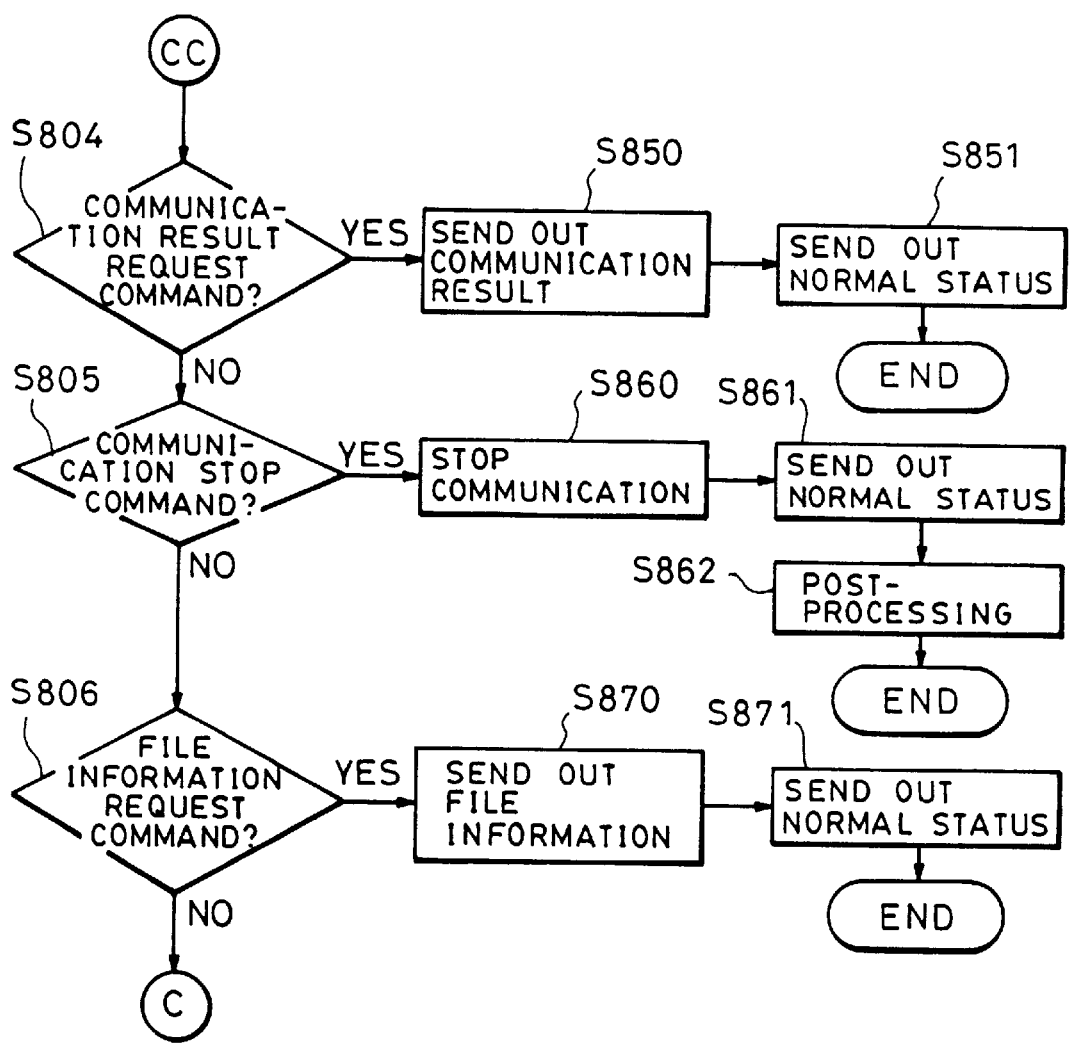
Figures 3, 8:
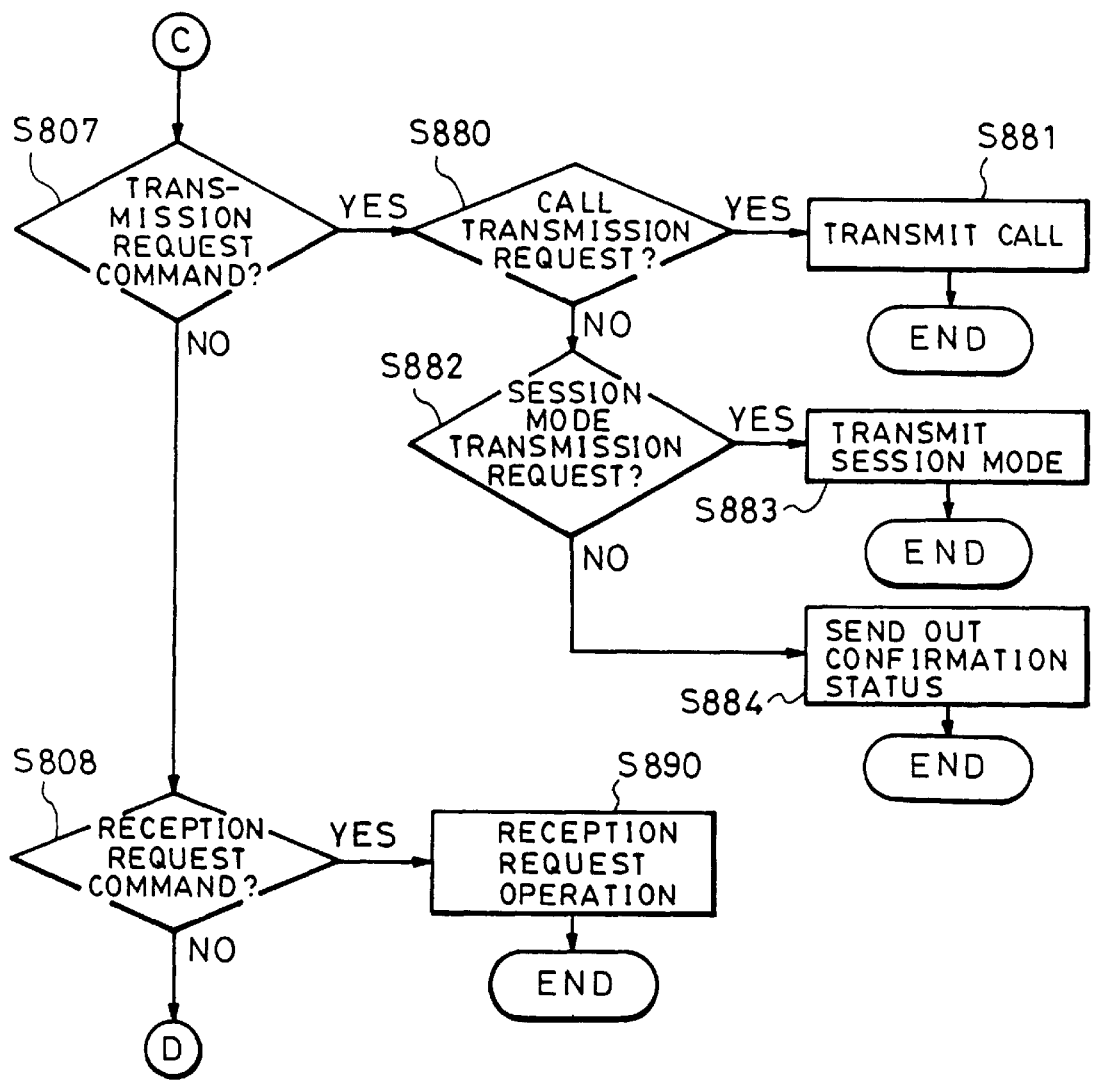
Figures 4, 8:
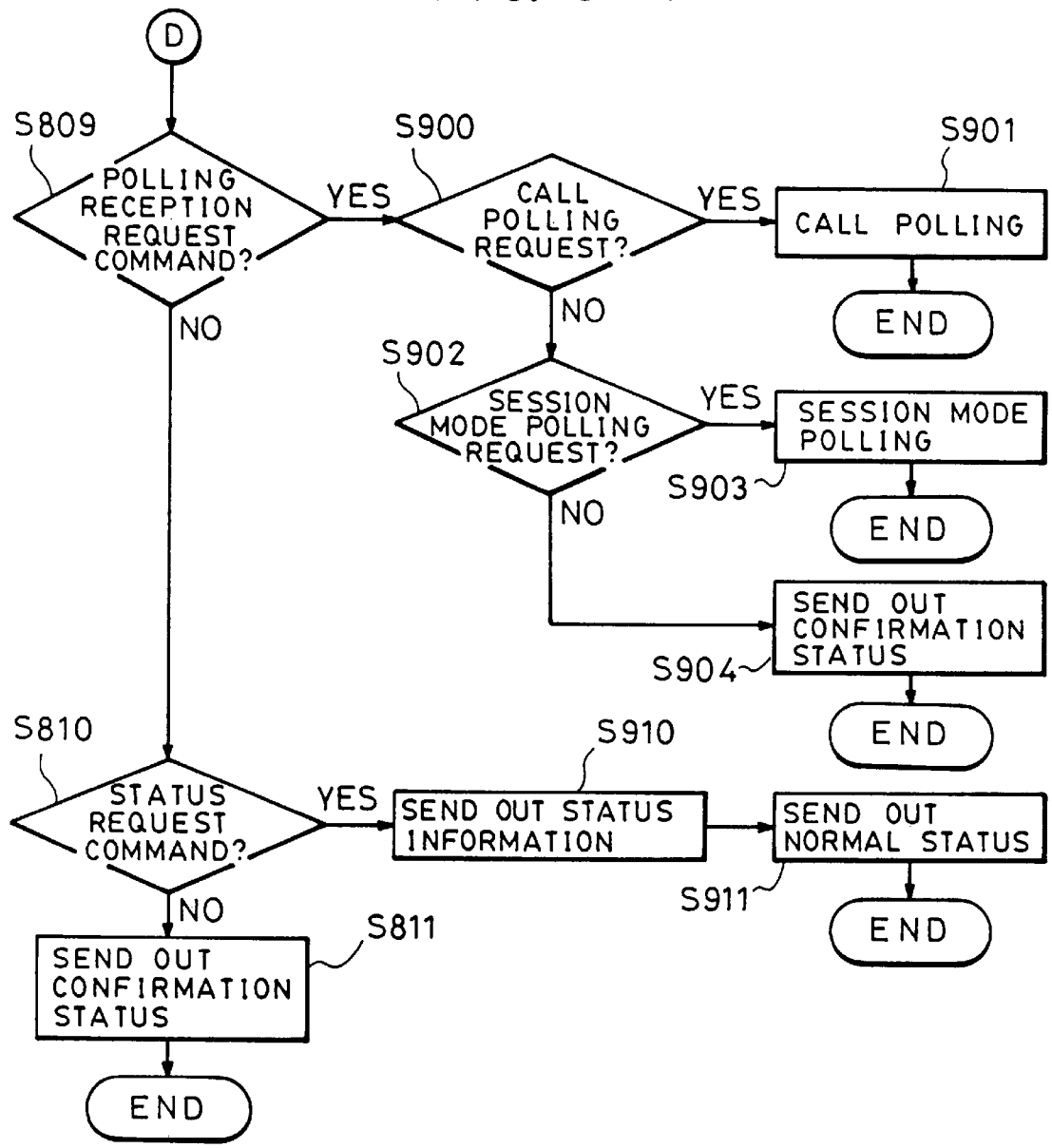

FIGS. 8-1 to 8-4 are flowcharts which illustrate the operations concerning communication command processing. FIG. 18 is a table which lists a group of parameters used for the communication command.

(Processing of Session Open Command)

This command is used to originate calls to a given terminal partner and to control the communication procedures up to a session layer (the fifth layer from the bottom among the seven layers).

When it is determined in step S801 shown in FIG. 8-1 that the command is a session open command, a calling operation is performed in step S820 by using address information specified by the host computer, terminal characteristics, and terminal performance information. In step S821, session open acknowledge response (RSSP) is received as the operation result. When it is determined that the calling operation has been terminated normally, a confirmation of a normal status regarding this operation is sent out in step S823. However, if a connection at end-to-end up to the session layer cannot be made, for example, a session start NAK response (RSSN) is received in step S821. In step S822, a confirmation of this status is sent out, and the operation is terminated.

(Processing of Information on Terminal Partner Request Command)

This command is used to notify the host computer of information on a terminal partner and information on the performance of a terminal partner, which are notified by RSSP and the like from the terminal partner, when a connection is made with the terminal partner up to the session layer in the above-described session open command processing.

When it is determined in step S802 that the command is an information on terminal partner request command, it is confirmed in step S830 that a connection up to the session layer has been made. When there is no data to be sent out, a confirmation of this status is sent out in step S831, and the operation is terminated. If, on the contrary, the status is "OK" in step S830, the information on the terminal partner is sent out in step S832, and the operation is terminated. The host computer receiving the information on the terminal partner displays this information on the display section.

As a result, it can be checked whether a desired terminal partner has been reliably called, and whether the desired terminal partner has the capability for processing a communication application which an operator of the host computer desires to use. Thus, transmission and reception of documents are made possible on the basis of the checked information.

(Processing of Session Close Command)

This command is used for a line disconnecting operation in a state in which a connection up to the session layer has been made.

When it is determined in step S803 that the command is a session close command, a disconnecting operation starting from sending out CSE is performed in step S840. In step S841, a confirmation of a normal status regarding this operation is sent out, and the operation is terminated.

(Processing of Communication Result Request Command)

This command is used to notify the host computer of the communication results when a transmission request command, a reception request command and a polling reception command, which will be described later, are executed.

When it is determined in step S804 shown in FIG. 8-2 that the command is a communication result request command, in step S850, the most recent communication result is notified to the host computer. In step S851, a confirmation of a normal status is sent out, and the operation is terminated.

(Processing of Communication Discontinue Command)

This command is used to discontinue the execution of a transmission request command, a reception request command and a polling reception command, which will be described later.

When it is determined in step S805 that the command is a communication discontinue command, an operation for discontinuing the communication is performed in step S860 so as to disconnect the line. A confirmation of a normal status regarding this operation is sent out in step S861. In the subsequent step S862, postprocessing for the command, the execution of which is discontinued, is performed, and the operation is terminated.

(Processing of File Information Request Command)

This command is used to notify the host computer of information on a document file received by the reception request command or the polling reception request command.

When it is determined in step S806 that the command is a file information request command, predetermined file information is sent out in step S870. In step S871, a confirmation of a normal status is sent out, and the operation is terminated.

(Processing of Transmission Request Command)

This command is used to make a terminal partner transmit a predetermined document file. It is presupposed that the documents to be transmitted are filed beforehand within the facsimile apparatus. There are two configurations in this embodiment in receiving a transmission request. One is a calling transmission request, and the other is a session mode transmission request. The operations for respective requests will be described later. A major difference between the two requests is that the request includes a calling operation or not.

When it is determined in step S807 shown in FIG. 8-3 that the command is a transmission request command, a check is made to determine whether the request is a calling transmission request in step S880. If the request is a calling transmission request, a calling transmission operation (this will be described later in accordance with the flowchart shown in FIG. 9) is performed in step S881.

When it is determined in step S880 that the request is not a calling transmission request, in step S882, a check is made to determine whether there is a session mode transmission request.

If it is determined in step S882 that there is a session mode transmission request, a session mode transmission operation (see the flowchart shown in FIG. 10) is performed in step S883. If it is determined in both steps S880 and S882 that there is no session mode transmission request, a confirmation of this status is sent out as error processing in step S884, and the operation is terminated.

(Processing of Reception Request Command)

This command is used to make the apparatus receive a document in the on-line mode. Regarding processing, when it is determined in step S808 that the command is a reception request command, a reception request operation is performed in step S890, and the operation is terminated (the details thereof will be explained with reference to the flowchart shown in FIG. 11).

(Processing of Polling Reception Request Command)

This command is used to receive polling from a given terminal partner. For this command, broadly, two processing configurations are supported in the same manner as the above-mentioned transmission request command. One is a call polling operation (see FIG. 12) and the other is a session mode polling operation (see FIG. 13).

When it is determined in step S809 shown in FIG. 8-4 that the command is a polling reception request command, a check is made in step S900 to determine whether the request is a call polling request. If the request is a call polling request, a call polling operation is performed in step S901. If the request is not a call polling request, a check is made in step S902 to determine whether the request is a session mode polling request. If the request is a session mode polling request, a session mode polling operation is performed in step S903.

If the request is not a call polling request in step S900, and if the request is not a call polling request in step S902, a confirmation of this status is sent out as error processing in step S904, and the operation is terminated.

(Processing of Status Request Command)

This command is issued when a confirmation of the status regarding other communication command processing is sent out and used to notify the host computer of the reasons why the the confirmation of the status is issued.

When it is determined in step S810 that the command is a status request command, status information is sent out in step S910, and the operation is terminated.

In step S811, when an undefined scanner command is received, a confirmation of this status is sent out.

Next, the operations set forth below in the communication command processing shown in FIGS. 8-3 and 8-4 will be explained in detail:

① the call transmission operation
② the session mode transmission operation
③ the reception request operation
④ the call polling operation
⑤ the session mode polling operation.

Figure 9:
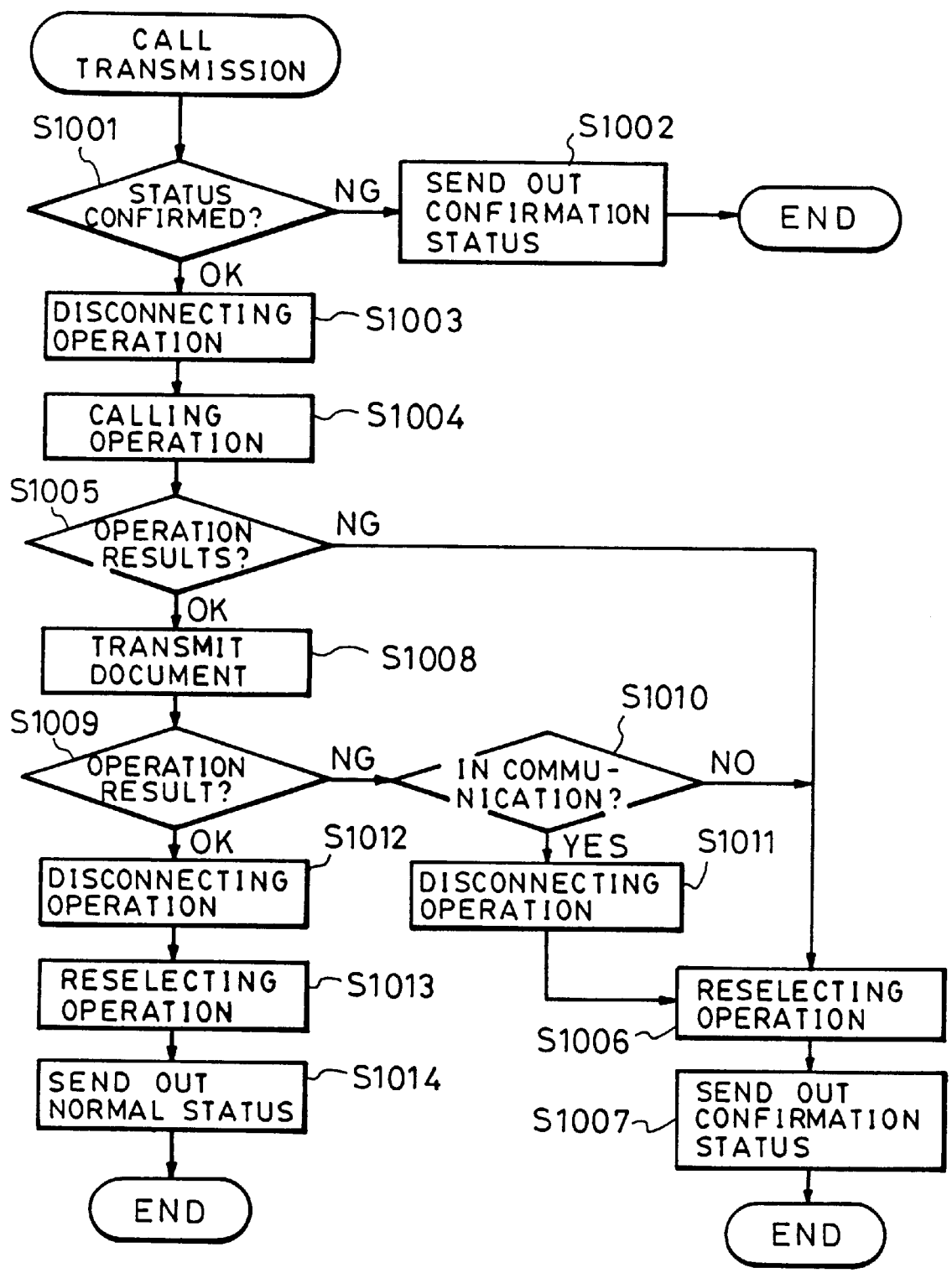
FIG. 9 is a flowchart which illustrates in detail a call transmission operation.

FIG. 9 is a flowchart which illustrates in detail a call transmission operation. In step S1001 shown in FIG. 9, a check is made to determine whether the apparatus is ready for originating a call. If the call transmission operation cannot be performed because, for example, the communication line is busy, a confirmation of this status is sent out in step S1002, and the operation is terminated.

On the other hand, if it is determined in step S1001 as a result of confirming the status that the apparatus is ready to transmit a call, it is disconnected in step S1003 so as to logically release the connection with the host computer so that a stop or other command can be received. In step S1004, a calling operation is performed on the basis of the address information specified by the host computer so that an operation for connecting with a terminal partner up to the session layer can be performed.

In step S1005, a check is made to determine whether the operation for connecting with the terminal partner has been performed normally. If it has not, a reselecting operation is performed in step S1006 so that a logical connection with the host computer is made. In the subsequent step S1007, a confirmation of this status is sent out, and the operation is terminated.

If the operation for connecting with the terminal partner has been performed normally in the determination of step S1005, a document specified by the host computer is transmitted in step S1008 after a connection up to the session layer has been completed. If it is determined in step S1009 that the operation has been terminated abnormally, the process proceeds to step S1010. If the operation has terminated normally, the process proceeds to step S1012.

In step S1010, a check is made to determine whether the facsimile apparatus is in a transmitting/receiving phase. If it is, the communication is disconnected in step S1011, and the process proceeds to the above-mentioned step S1006. If it is not, the process proceeds directly to step S1006. In step S1012, the communication is disconnected. In the subsequent step S1013, a reselecting operation is performed, and then in step S1014, a confirmation of a normal status is sent out, and the operation is terminated.

Figure 10:
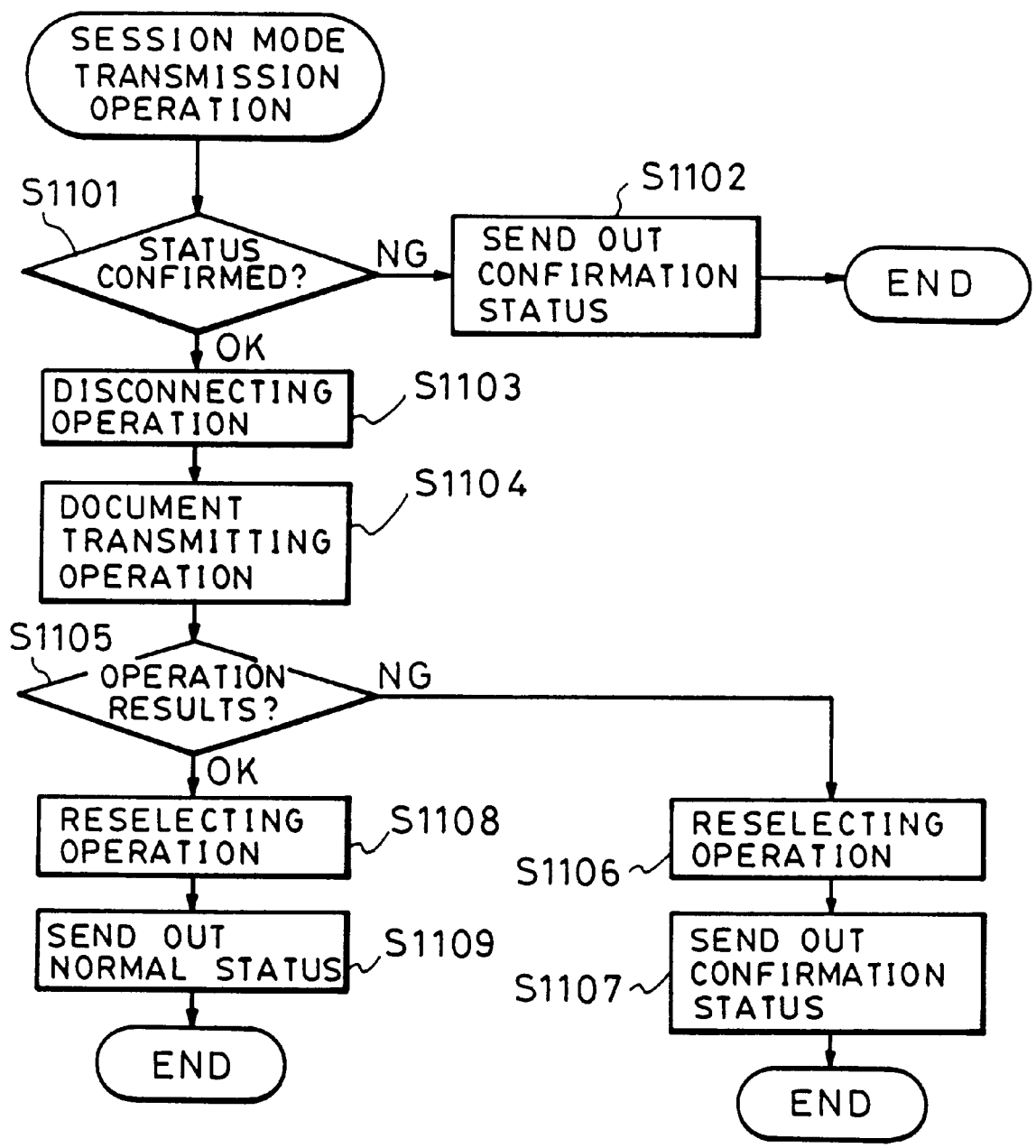
FIG. 10 is a flowchart which illustrates a session mode transmission operation.

FIG. 10 is a flowchart which illustrates a session mode transmission operation. In step S1101 shown in FIG. 10, a check is made to determine whether a connection with a predetermined terminal partner up to the session layer has been made. If it is determined that this operation cannot be continued, a confirmation of this status is sent out in step S1102, and the operation is terminated.

If, however, the above-mentioned connection has been made in the determination of step S1101, a disconnecting operation is performed in step S1103. In the subsequent step S1104, a document is transmitted. If it is determined in step S1105 that the document transmission operation has been terminated abnormally, the process proceeds to step S1106, at which step a reselecting operation is performed. In the subsequent step S1107, a confirmation of this status is sent out, and the operation is terminated.

On the other hand, if the document transmission operation has been terminated normally in the determination of step S1105, a reselecting operation is performed in step S1108. In the subsequent step S1109, a confirmation of a normal status is sent out, and the operation is terminated.

Figure 11:
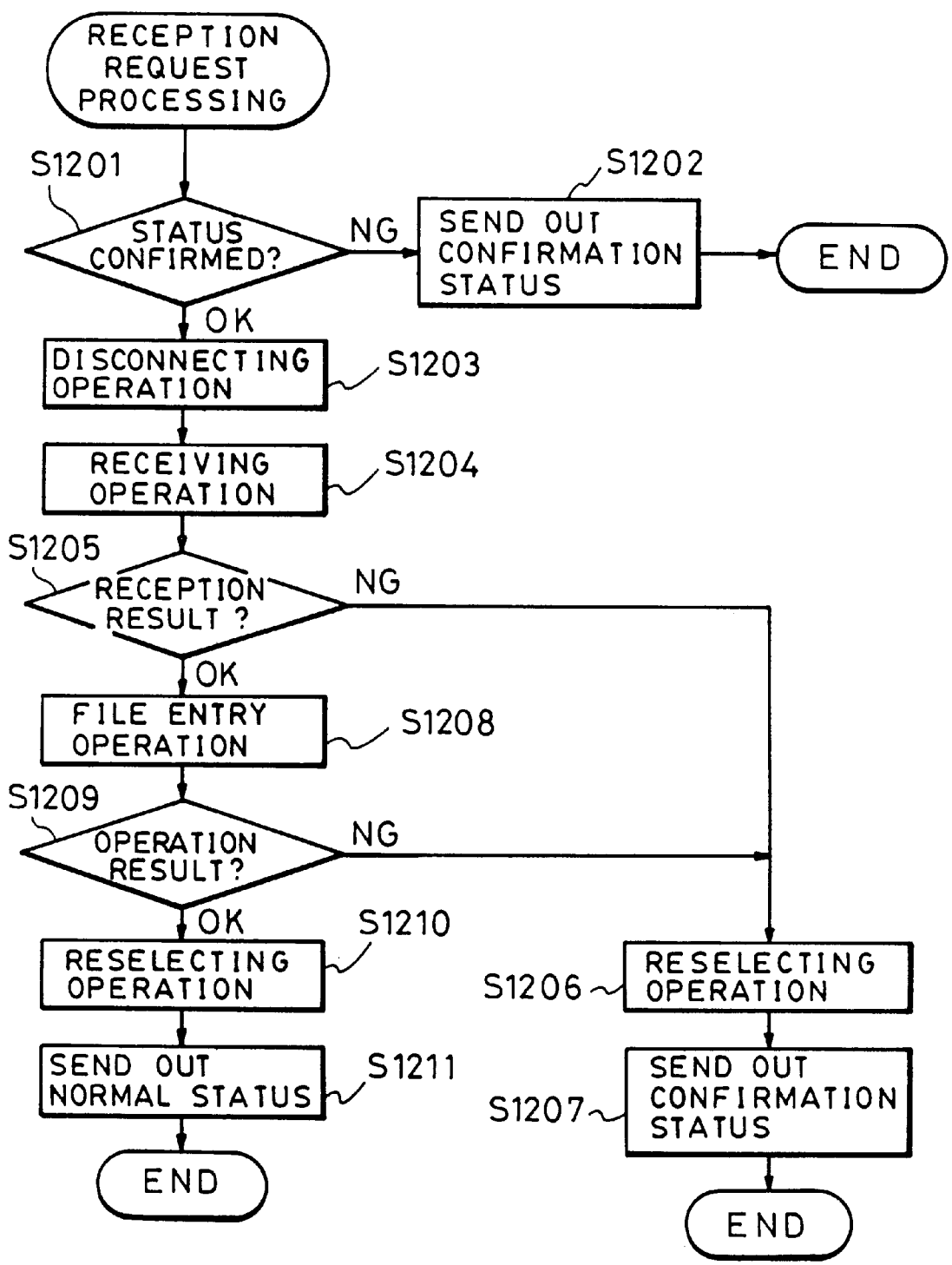
FIG. 11 is a flowchart which illustrates an operation concerning reception request processing.

FIG. 11 is a flowchart which illustrates the operation concerning reception request processing. In step S1201 shown in FIG. 11, a check is made to determine whether the facsimile apparatus is ready for reception. If it is determined that the facsimile apparatus is not ready for reception, a confirmation of this status is sent out in step S1202, and the operation is terminated.

If it is determined that the facsimile apparatus is ready for reception, the process proceeds to step S1203 where a disconnecting operation is performed, and then the process proceeds to step S1204, at which step the apparatus waits for reception. In this embodiment, the apparatus waits for an incoming call from an arbitrary terminal. If there is a call, a reception operation is performed, receiving the call. In step S1205, the result of the reception is checked. If it is "not OK", the process proceeds to step S1206 where a reselecting operation is performed. In the subsequent step S1207, a confirmation of this status is sent out, and the operation is terminated.

If, on the contrary, the indication of the reception result is "OK", the received document is filed in step S1208. If the reception result indicated in step S1209 is "not OK", the process proceeds to step S1206; if the reception result indicates that it is "OK", the process proceeds to step S1210.

In steps S1206 and S1210, a reselecting operation is performed. In step S1207, a confirmation of this status is sent out. In step S1211, a confirmation of a normal status is sent out. This terminates the operation.

Figures 1, 12:
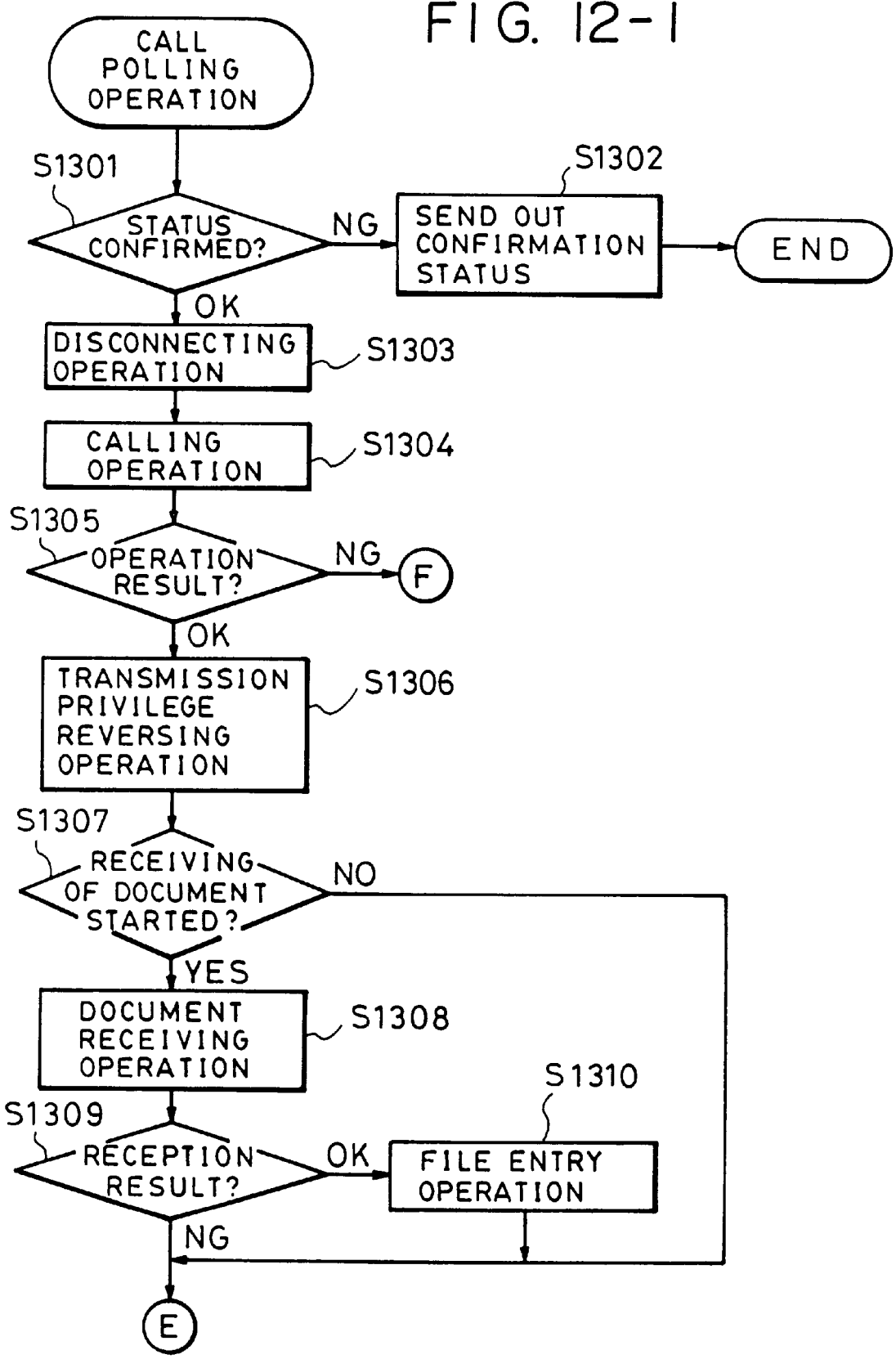
Figures 2, 12:
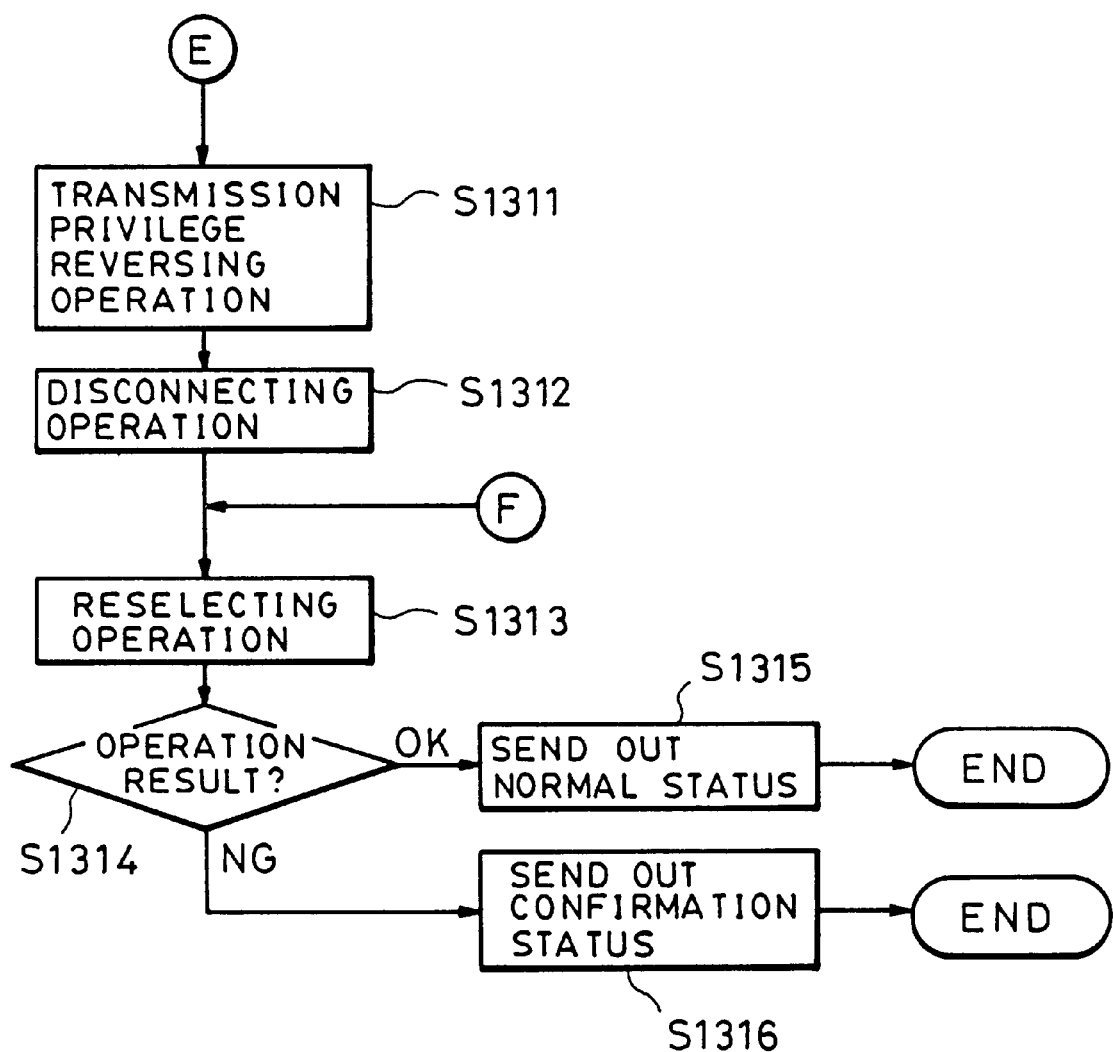

FIGS. 12-1 and 12-2 are flowcharts which illustrate a call polling operation procedure.

In step S1301 shown in FIG. 12-1, first, a check is made of the status within the facsimile apparatus. If it is determined that this operation cannot be continued, a confirmation of this status is sent out in step S1302, and the operation is terminated. If, on the contrary, this operation can be continued, the process proceeds to step S1303, at which step a disconnecting operation is performed. In the subsequent step S1304, a call is originated to the terminal partner specified by the host computer, and a connection up to the session layer is made. Then, in step S1305, the result of the operation is checked. If it is "not OK", the process proceeds to step S1313 (see FIG. 12-2).

If the determination result in step S1305 is "OK", an operation for reversing a transmission privilege (reversing a session) is performed in step S1306. In the subsequent step S1307, the facsimile apparatus waits for a document to be reached. When a document from the terminal partner begins to be reached by CDS, the document is received in step S1308. However, if it is requested that the transmission privilege is reversed in a state in which the document is not being transmitted from the terminal partner, the process proceeds to step S1311 (see FIG. 12-2).

The result of the reception operation is checked in step S1309. If it is "OK", the process proceeds to step S1310 where the received document is filed. If, on the contrary, it is "not OK", the process proceeds directly to step S1311 shown in FIG. 12-2, at which step a transmission privilege reversing operation is performed so as to return the transmission privilege to its original state. Then, in step S1312, the line is disconnected. In the subsequent step S1313, a reselecting operation is performed. Then, in step S1314, checks are made to determine whether the series of operations have been terminated normally or abnormally. When the series of operations have been terminated normally, a confirmation of a normal status regarding the series of operations is sent out in step S1315. When the series of operations have been terminated abnormally, a confirmation of this status is sent out in step S1316. This terminates the series of operations.

Figure 13:
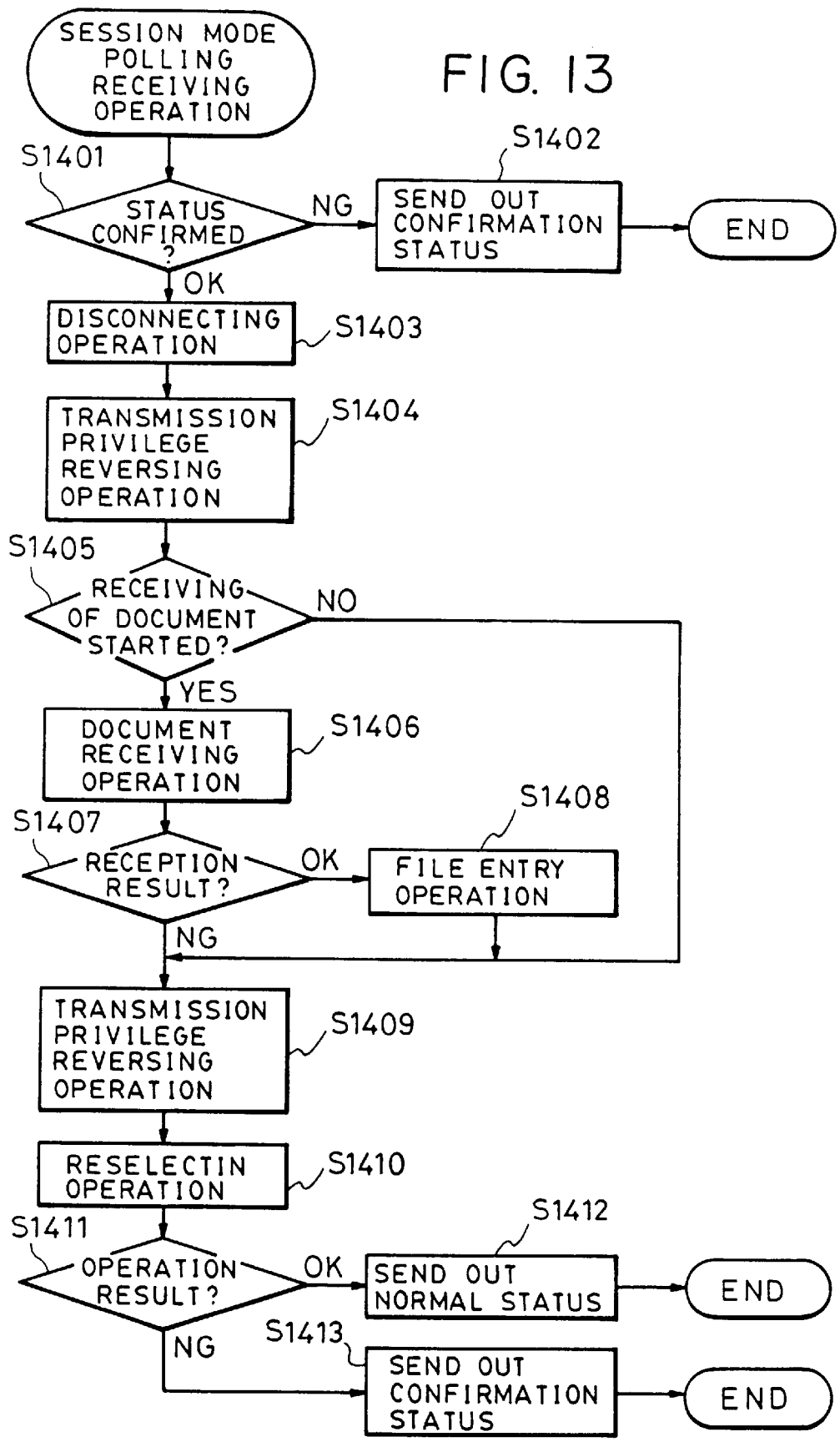
FIG. 13 is a flowchart which illustrates a session mode polling reception operation.

FIG. 13 is a flowchart which illustrates a session mode polling reception operation. In step S1401 shown in FIG. 13, a check is made to determine whether a connection up to the session layer has been made and this operation can be performed. If it is determined that this operation cannot be performed, a confirmation of this status is sent out in step S1402, and the operation is terminated. If, on the contrary, this operation can be performed, a disconnecting operation is performed in step S1403. In the subsequent step S1404, an operation for reversing a transmission privilege is performed.

In step S1405, the apparatus waits for the reception of a document. When a document starts to be transferred by CDS from a terminal partner, the document is received in step S1406. If it is requested that the transmission privilege be reversed immediately from the terminal partner, postprocessing incidental to that request is performed in step S1409.

In step S1407, the result of the document reception operation is checked. If the document reception operation has been terminated normally, the document is filed in step S1408. If, however, the document reception operation has been terminated abnormally, the process proceeds directly to step S1409, at which step an operation for reversing a transmission privilege is performed. In the subsequent step S1410, a reselecting operation is performed, and then the results of the operations up to this point are checked.

If the operations have been terminated normally, a confirmation of a normal status regarding the operations is sent out in step S1412; if the operations have been terminated abnormally, a confirmation of this status is sent out in step S1413. This terminates the series of operations.

As has been explained above, according to this embodiment, an interface section is provided with flexibility so that commands can be sent from a facsimile apparatus to a host computer such as a personal computer, or vice versa. As a result, there is an advantage in that the units which constitute the facsimile apparatus can be easily and flexibly used to their fullest by a host computer.

The use of the SCSI standard as an interface results in the advantage that images can be transferred between facsimile apparatuses and a host computer at a speed higher than that when the conventional RS-232C, GPIB or the like are used. In addition, there is the advantage that the number of steps required for the development of applications on the host computer side can be reduced because a more flexible, logical interface is provided for the development thereof.

Although in the above-described embodiment, the facsimile apparatus has one scanner, one printer, one image memory, and each of the units related to communication control, a modification can be made, without departing from the spirit and scope of the present invention, in which the facsimile apparatus has two or more of each other these elements, or in which one of these elements is not provided.

In addition, the present invention may be applied to a system formed of a plurality of components, or to an apparatus formed of one component. It goes without saying that the present invention may be applied to a case in which the object thereof is achieved by supplying programs to a system or apparatus.

As has been explained above, according to the present invention, commands can be sent from a facsimile apparatus to a host computer such as a personal computer, or vice versa. As a result, there is an advantage in that the units which constitute the facsimile apparatus can be easily and flexibly used to their fullest by a host computer.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded a broad interpretation, so as to encompass all such modifications and equivalent structures and functions.

What is claimed is:

1. A method of controlling a data processing apparatus in a data processing system having said data processing apparatus and a host computer, said method comprising
    an input step of inputting data;
    a storage step of storing the data input in said input step;
    a notification step of notifying the host computer of an ID for specifying the data stored in said storage step;
    an instruction reception step of receiving an instruction from the host computer; and
    a processing step of processing the data based on the instruction received in said instruction reception step,
    wherein said instruction reception step receives the instruction including the ID, and said processing step processes the data that is specified by the instruction including the ID.

2. A method according to claim 1, wherein said notification step notifies the host computer of a list of IDs for retrieving the data stored in said storage step.

3. A method according to claim 1, wherein said input step inputs the data from a communication partner through a network.

4. A method according to claim 1, wherein said input step inputs the data from a reader of the data processing apparatus.

5. A method according to claim 1, wherein said processing step transmits the data to a communication partner through a network.

6. A method according to claim 1, wherein said processing step prints the data using a printer of the data processing apparatus.

7. A method according to claim 1, wherein said processing step transfers the data to the host computer.

8. A method according to claim 1, wherein said processing step deletes the data stored in said storage step.

9. A method as recited in claim 1, wherein the data processing apparatus is included in a facsimile apparatus.

10. A method of controlling a data processing apparatus in a data processing system having the data processing apparatus and a host computer, said method comprising:
    a reading step of reading an original image on a document and outputting image data based on the original image using a reader of the data processing apparatus;
    a storage step of storing the image data output in said reading step;
    a notification step of notifying the host computer of information as to whether or not the document is set on the reader;
    an instruction reception step of receiving an instruction including a reading parameter from the host computer; and
    a control step of controlling the reader such that the reader operates in accordance with the reading parameter.

11. A method according to claim 10, wherein said notification step notifies the host computer of a cause of abnormality.

12. A method according to claim 10, wherein the reading parameter received in said instruction reception step includes resolution, reading size, or density.

13. A method recited in claim 10, wherein the data processing apparatus is included in a facsimile apparatus.

14. An image processing apparatus comprising:
    reading means for reading an original image on a document and outputting image data based on the original image;
    connecting means for connecting a host computer;
    instruction reception means for receiving an instruction from the host computer via said connecting means;
    transmission means for transmitting the image data output from said reading means through a network;
    transferring means for transferring the image data output from said reading means to the host computer through said connecting means;
    notification means for notifying the host computer, through said connecting means, of information as to whether or not the document is set on said reading means; and
    control means for controlling said reading means, said transmission means and said transferring means such that the image data from said reading means is output to a proper destination in accordance with the instruction received by said instruction reception means.

15. An apparatus according to claim 14, further comprising printing means for printing an image based on the image data from said reading means,
    wherein said control means further controls said printing means such that the image means in accordance reading means is output to said printing means in accordance with the instruction received by said instruction reception means.

16. An apparatus according to claim 14, wherein the instruction received by said instruction reception means includes a reading parameter for reading the original image by said reading means.

17. An apparatus according to claim 14, wherein the instruction received by said instruction reception means includes address information for transmitting the image data by said transmission means.

18. An apparatus according to claim 14, wherein said image processing apparatus is included in a facsimile apparatus.

19. A data processing apparatus comprising:
    connecting means for connecting a host computer;
    reading means for reading an original image on a document and outputting image data based on the original image;
    reception means for receiving image data through a network;
    input means for inputting image data from the host computer through said connecting means;

storage means for storing the image data obtained from said reading means, reception means or said input means to a storage medium;

printing means for printing an image based on the image data;

transmission means for transmitting the image data through the network;

transfer means for transferring the image data to the host computer through said connecting means;

instruction reception means for receiving an instruction from the host computer through said connecting means; and control means for controlling said reading means, said reception means, said input means, said storage means, said printing means and said transfer means such that the image data stored to the storage medium by said storage means based on an instruction received by said instruction reception means is outputted to said printing means, said transmission means or said transfer means based on another instruction received by said instruction reception means.

20. An apparatus according to claim 19, wherein said storage means stores the image data as a file to the storage medium equipped to said data processing apparatus.

21. An apparatus according to claim 20, further comprising notification means for notifying the host computer of attribute information of the file stored in the storage medium.

22. An apparatus according to claim 19, wherein the instruction received by said instruction reception means includes a parameter for performing a job.

23. An apparatus according to claim 22, wherein the parameter includes resolution information of the image data.

24. The data processing apparatus as recited in claim 19, wherein said data processing apparatus is included in a facsimile apparatus.

25. An image processing method comprising:

a reading step of reading an original image on a document placed on a reading means and outputting image data based on the original image;

a connecting step of connecting a host computer;

an instruction reception step of receiving an instruction from the host computer via said connecting step;

a transmission step of transmitting the image data output at said reading step through a network;

a transferring step of transferring the image data output at said reading step to the host computer through said connecting step;

a notification step of notifying the host computer, through said connecting step, of information as to whether or not the document is set on the reading means; and a control step for controlling said reading step, said transmission step and said transferring step such that the image data read at said reading step is output to a proper destination in accordance with the instruction received at said instruction reception step.

26. A method according to claim 25, further comprising a printing step for printing, using a printing means, an image based on the image data from said reading step, wherein said control step further controls the printing means such that the image data read at said reading step is output to the printing means in accordance with the instruction received by said instruction reception step.

27. A method according to claim 25, wherein the instruction received by said instruction reception step includes a reading parameter for reading the original image at said reading step.

28. A method according to claim 25, wherein the instruction received by said instruction reception step includes address information for transmitting the image data by said transmission step.

29. A method according to claim 25, wherein said image processing method is executed by a facsimile apparatus.

30. A data processing method comprising:

a connecting step of connecting a host computer;

a reading step of reading an original image on a document and outputting image data based on the original image;

a reception step of receiving image data through a network;

an input step of inputting image data from the host computer through said connecting step;

a storage step of storing the image data obtained from said reading step, reception step or said input step to a storage medium;

a printing step of printing an image based on the image data using a printing means;

a transmission step of transmitting the image data through the network;

a transfer step of transferring the image data to the host computer through said connecting step;

an instruction reception step of receiving an instruction from the host computer through said connecting step; and a control step of controlling said reading step, said reception step, said input step, said storage step, said printing step and said transfer step such that the image data stored to the storage medium by said storage step based on an instruction received at said instruction reception step is outputted to be used by said printing step, said transmission step or said transfer step based on another instruction received at said instruction reception step.

31. A method according to claim 30, wherein said storage step stores the image data as a file to the storage medium equipped to a data processing apparatus executing said method.

32. A method according to claim 31, further comprising a notification step of notifying the host computer of attribute information of the file stored in the storage medium.

33. A method according to claim 30, wherein the instruction received at said instruction reception step includes a parameter for performing a job.

34. A method according to claim 33, wherein the parameter includes resolution information of the image data.

35. A method according to claim 30, wherein said data processing method is executed by a facsimile apparatus.

36. A computer-readable medium storing instructions to cause a processor-controlled image processing apparatus to perform a method comprising:

a reading step of reading an original image on a document placed on a reading means and outputting image data based on the original image;

a connecting step of connecting a host computer;

an instruction reception step of receiving an instruction from the host computer via said connecting step;

a transmission step of transmitting the image data output at said reading step through a network;

a transferring step of transferring the image data output at said reading step to the host computer through said connecting step;

a notification step of notifying the host computer, through said connecting step, of information as to whether or not the document is set on the reading means; and a control step for controlling said reading step, said transmission step and said transferring step such that the image data read at said reading step is output to a proper destination in accordance with the instruction received at said instruction reception step.

37. A computer-readable medium according to claim 36, the method further comprising a printing step of printing, using a printing means, an image based on the image data from said reading step, wherein said control step further controls the printing means such that the image data read at said reading step is output to the printing means in accordance with the instruction received by said instruction reception step.

38. A computer-readable medium according to claim 36, wherein the instruction received by said instruction reception step includes a reading parameter for reading the original image at said reading step.

39. A computer-readable medium according to claim 36, wherein the instruction received by said instruction reception step includes address information for transmitting the image data by said transmission step.

40. A computer-readable medium according to claim 36, wherein said image processing apparatus is included in a facsimile apparatus.

41. A computer-readable medium storing instructions to cause a processor controlled data processing apparatus to perform a method comprising:

a connecting step of connecting a host computer;

a reading step of reading an original image on a document and outputting image data based on the original image;

a reception step of receiving image data through a network;

an input step of inputting image data from the host computer through said connecting step;

a storage step of storing the image data obtained from said reading step, reception step or said input step to a storage medium;

a printing step of printing an image based on the image data using a printing means;

a transmission step of transmitting the image data through the network;

a transfer step of transferring the image data to the host computer through said connecting step;

an instruction reception step of receiving an instruction from the host computer through said connecting step; and a control step of controlling said reading step, said reception step, said input step, said storage step, said printing step and said transfer step such that the image data stored to the storage medium by said storage step based on an instruction received at said instruction reception step is outputted to be used by said printing step, said transmission step or said transfer step based on another instruction received at said instruction reception step.

42. A computer-readable medium according to claim 41, wherein said storage step stores the image data as a file to the storage medium equipped to the data processing apparatus.

43. A computer-readable medium according to claim 42, the method further comprising a notification step of notifying the host computer of attribute information of the file stored in the storage medium.

44. A computer-readable medium according to claim 41, wherein the instruction received at said instruction reception step includes a parameter for performing a job.

45. A computer-readable medium according to claim 44, wherein the parameter includes resolution information of the image data.

46. A computer-readable medium according to claim 41, wherein said data processing apparatus is included in a facsimile apparatus.

* * * * *

UNITED STATES PATENT AND TRADEMARK OFFICE
CERTIFICATE OF CORRECTION

PATENT NO. : 6,064,491

DATED : May 16, 2000

INVENTOR(S) : NAOYUKI MATSUMOTO

It is certified that error appears in the above-identified patent and that said Letters Patent is hereby corrected as shown below:

SHEET 22

Figure 13, "RESELECTIN" should read --RESELECTING-.

SHEET 26

Figure 17, "RAGE" should read --PAGE--.

SHEET 29

Figure 20, "SCCANNING" should read --SCANNING--.

COLUMN 4

Line 33, "4n" should read --in--.

COLUMN 5

Line 3, "information" should read --Information--.

COLUMN 9

Line 49, "operations" should read --operation--.

UNITED STATES PATENT AND TRADEMARK OFFICE
CERTIFICATE OF CORRECTION

PATENT NO. : 6,064,491

DATED : May 16, 2000

INVENTOR(S) : NAOYUKI MATSUMOTO

It is certified that error appears in the above-identified patent and that said Letters Patent is hereby corrected as shown below:

COLUMN 12

Line 5, "the the" should read --the--.

COLUMN 14

Line 66, "other these" should read --of these--.

COLUMN 16

Line 43, "image means in accordance" should read
--image data from said reading means is output to said printing means in accordance--.

Signed and Sealed this

Tenth Day of April, 2001

Attest:

NICHOLAS P. GODICI

Attesting Officer     Acting Director of the United States Patent and Trademark Office